(12) United States Patent
Ishikura

(10) Patent No.: US 11,733,836 B2
(45) Date of Patent: Aug. 22, 2023

(54) DISPLAY METHOD INCLUDING WIDENING GAP BETWEEN IMAGES AND DISPLAY APPARATUS

(71) Applicant: SEIKO EPSON CORPORATION, Tokyo (JP)

(72) Inventor: Keigo Ishikura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/935,450

(22) Filed: Jul. 22, 2020

(65) Prior Publication Data
US 2021/0026507 A1 Jan. 28, 2021

(30) Foreign Application Priority Data
Jul. 23, 2019 (JP) .................. 2019-135367

(51) Int. Cl.
G06F 3/0483 (2013.01)
H04N 1/00 (2006.01)
G06F 3/0485 (2022.01)

(52) U.S. Cl.
CPC .......... *G06F 3/0483* (2013.01); *G06F 3/0485* (2013.01); *H04N 1/00161* (2013.01)

(58) Field of Classification Search
CPC .. G06F 3/0483; G06F 3/0485; G06F 3/04883; H04N 1/00161
See application file for complete search history.

(56) References Cited

U.S. PATENT DOCUMENTS

| 5,880,733 | A | * | 3/1999 | Horvitz | G06F 3/04815 |
| | | | | | 715/850 |
| 6,262,732 | B1 | * | 7/2001 | Coleman | G06F 40/166 |
| | | | | | 715/835 |
| 7,437,005 | B2 | * | 10/2008 | Drucker | G06F 3/0483 |
| | | | | | 382/224 |
| 7,685,163 | B2 | * | 3/2010 | Chaudhri | G06F 16/50 |
| | | | | | 707/804 |
| 7,797,641 | B2 | * | 9/2010 | Karukka | G06F 3/0482 |
| | | | | | 715/802 |

(Continued)

FOREIGN PATENT DOCUMENTS

| JP | 2000-298679 A | 10/2000 |
| JP | 2012-164292 A | 8/2012 |

(Continued)

*Primary Examiner* — Matthew Ell
*Assistant Examiner* — Kenny Nguyen
(74) *Attorney, Agent, or Firm* — Oliff PLC

(57) ABSTRACT

A display method according to the present disclosure includes a display step of displaying an image group including a plurality of images and having a dense region where the plurality of images are so densely arranged that the images partially overlap with each other and a sparse region where the arrangement of the images is sparser than in the dense region, a selection step of selecting any of the images located in the sparse region as a selected image, a movement step of moving the selected image to a predetermined destination in the dense region, a wide gap step of converting a dense state at the destination into a sparse state at the destination by widening a gap between the images adjacent to each other at the destination, and a placement step of placing the selected image at the destination having the sparse state.

5 Claims, 18 Drawing Sheets

(56) References Cited

U.S. PATENT DOCUMENTS

| | | | |
|---|---|---|---|
| 8,201,096 B2* | 6/2012 | Robert | G06F 3/04817 715/767 |
| 8,339,497 B2* | 12/2012 | Iwase | G06F 3/04883 348/333.01 |
| 8,352,882 B2* | 1/2013 | Sciammarella | G06F 3/0482 715/838 |
| 8,379,129 B2* | 2/2013 | Iwase | A63F 13/426 348/333.01 |
| 8,421,845 B2* | 4/2013 | Ishiyama | H04N 13/275 348/42 |
| 8,429,530 B2* | 4/2013 | Neuman | G06F 3/04817 715/716 |
| 8,564,543 B2* | 10/2013 | Chaudhri | G06F 3/04845 345/173 |
| 8,571,380 B2* | 10/2013 | Sugano | H04N 21/4314 386/230 |
| 8,587,528 B2* | 11/2013 | Chaudhri | G06F 1/1694 345/173 |
| 8,707,192 B2* | 4/2014 | Robert | G06F 3/04817 715/767 |
| 8,713,462 B2* | 4/2014 | Robert | G06F 16/4387 715/767 |
| 8,732,600 B2* | 5/2014 | Robert | G06F 16/41 715/767 |
| 9,009,622 B2* | 4/2015 | Roberts | G06F 16/434 715/802 |
| 9,015,582 B2* | 4/2015 | Kodimer | G06F 3/04883 715/251 |
| 9,053,103 B2* | 6/2015 | Ilama-Vaquero | G11B 27/105 |
| 9,058,337 B2* | 6/2015 | Bray | G06F 3/0481 |
| 9,189,884 B2* | 11/2015 | Gharpure | H04N 13/139 |
| 9,417,781 B2* | 8/2016 | Lee | G06F 3/0483 |
| 9,489,106 B2* | 11/2016 | Chaudhri | G06F 3/0412 |
| 9,678,623 B2* | 6/2017 | Neuman | G06F 3/04815 |
| 9,984,495 B2* | 5/2018 | Gharpure | H04N 13/139 |
| 10,133,475 B2* | 11/2018 | Chaudhri | G06F 16/904 |
| 10,198,144 B2* | 2/2019 | Munoz | G06F 3/04842 |
| 10,289,683 B2* | 5/2019 | Robert | G06F 16/116 |
| 10,379,726 B2* | 8/2019 | Martin | G06F 3/1204 |
| 10,552,036 B2* | 2/2020 | Kim | G06F 3/04883 |
| 10,942,648 B2* | 3/2021 | Kim | G06F 3/04883 |
| 2004/0250217 A1* | 12/2004 | Tojo | G06F 3/0482 715/810 |
| 2004/0261103 A1* | 12/2004 | Ohno | H04N 1/00442 725/38 |
| 2005/0091596 A1* | 4/2005 | Anthony | G06F 3/0482 715/712 |
| 2007/0168883 A1* | 7/2007 | Sugimoto | G06F 1/1616 715/818 |
| 2008/0062141 A1* | 3/2008 | Chandhri | G06F 1/1694 345/173 |
| 2008/0120571 A1* | 5/2008 | Chang | G06F 3/0483 715/810 |
| 2009/0002335 A1* | 1/2009 | Chaudhri | G06F 16/904 345/173 |
| 2010/0318928 A1* | 12/2010 | Neuman | G06F 3/0482 715/769 |
| 2012/0079375 A1* | 3/2012 | Ogino | G06K 15/1867 715/274 |
| 2012/0166987 A1* | 6/2012 | Kang | G06F 3/0486 715/765 |
| 2012/0204099 A1* | 8/2012 | Yamada | G06F 3/0483 715/244 |
| 2012/0269491 A1* | 10/2012 | Sugano | H04N 5/44513 386/230 |
| 2012/0287165 A1* | 11/2012 | Yamada | G09G 3/344 345/672 |
| 2013/0002585 A1* | 1/2013 | Jee | G06F 3/0483 345/173 |
| 2013/0083069 A1* | 4/2013 | Yakishyn | G06F 3/04817 345/634 |
| 2013/0151966 A1* | 6/2013 | Neuman | G06F 3/0482 715/716 |
| 2014/0132594 A1* | 5/2014 | Gharpure | H04N 13/139 345/419 |
| 2014/0153014 A1* | 6/2014 | Kaneda | H04N 1/00411 358/1.15 |
| 2014/0157189 A1* | 6/2014 | Morita | G06F 3/0482 715/784 |
| 2015/0277677 A1* | 10/2015 | Wu | G06F 3/0488 715/776 |
| 2016/0042555 A1* | 2/2016 | Gharpure | G06T 15/205 345/419 |
| 2017/0060349 A1* | 3/2017 | Munoz | G06F 3/0482 |
| 2018/0136810 A1* | 5/2018 | Martin | G06F 3/1256 |
| 2020/0241710 A1* | 7/2020 | Yamada | G06F 3/04817 |
| 2020/0409615 A1* | 12/2020 | Yamada | G06F 3/1208 |
| 2021/0026507 A1* | 1/2021 | Ishikura | G06F 3/0483 |
| 2021/0027749 A1* | 1/2021 | Ishikura | G09G 5/363 |
| 2021/0064198 A1* | 3/2021 | Yamada | G06T 3/40 |
| 2021/0065557 A1* | 3/2021 | Kim | G08G 1/22 |

FOREIGN PATENT DOCUMENTS

| | | |
|---|---|---|
| JP | 2012-238223 A | 12/2012 |
| JP | 2014-053669 A | 3/2014 |
| JP | 2018-081683 A | 5/2018 |

* cited by examiner

DISPLAY METHOD INCLUDING WIDENING GAP BETWEEN IMAGES AND DISPLAY APPARATUS

The present application is based on, and claims priority from JP Application Serial Number 2019-135367, filed Jul. 23, 2019, the disclosure of which is hereby incorporated by reference herein in its entirety.

BACKGROUND

1. Technical Field

The present disclosure relates to a display method and a display apparatus.

2. Related Art

In recent years, a variety of display apparatuses employ listing a predetermined number of reduced images of a plurality of images and displaying thumbnails that allow recognition of the contents described in the read images.

As an example of the thumbnails, there is a proposed display apparatus employing a user interface (UI) that allows a user to readily grasp the contents described in the images displayed in the form of thumbnails by three-dimensionally rotating the images, that is, pages and displaying at least part of the images with part of an image overlapping with part of the adjacent image to display information on a large number of images in a single screen (see JP-A-2012-238223, for example).

The thus configured display apparatus displays the thumbnails with adjacent images overlapping with each other, as described above. The thumbnails overlap with each other in such a way that there are a dense region having a dense overlapping state and a sparse region having an overlapping state sparser than the dense overlapping state, whereby information on the images displayed in the sparse region is readily recognized.

A display apparatus having a configuration different from the configuration disclosed in JP-A-2012-238223 (see JP-A-2014-53669, for example) presents a proposal to employ the following thumbnails: Images are so juxtaposed on an image display section as not to overlap with each other; an image is selected from the plurality of images on the image display section; and the position where the image having been selected, that is, the selected image is placed is moved, that is, the images that form the thumbnails are rearranged.

When the movement of the selected image placement position in the thumbnails, which is proposed in JP-A-2014-53669, is applied to the thumbnails proposed in JP-A-2012-238223 to select an image placed in the sparse region and move the selected image to the dense region, however, the destination to which the selected image should be moved cannot be correctly recognized because images densely adjacent to each other overlap with each other in the dense region. As a result, it is conceivable that a problem of incorrect movement of the selected image to the destination occurs.

SUMMARY

The present disclosure can be implemented in the form of the following application example.

A display method according to an application example of the present disclosure includes a display step of displaying an image group including a plurality of images and having a dense region where the plurality of images are so densely arranged that the images partially overlap with each other and a sparse region where the arrangement of the images is sparser than in the dense region, a selection step of selecting any of the images located in the sparse region as a selected image, a movement step of moving the selected image to a predetermined destination in the dense region, a wide gap step of converting a dense state at the destination into a sparse state at the destination by widening a gap between the images adjacent to each other at the destination, and a placement step of placing the selected image at the destination having the sparse state.

DESCRIPTION OF EXEMPLARY EMBODIMENTS

Figure 1:
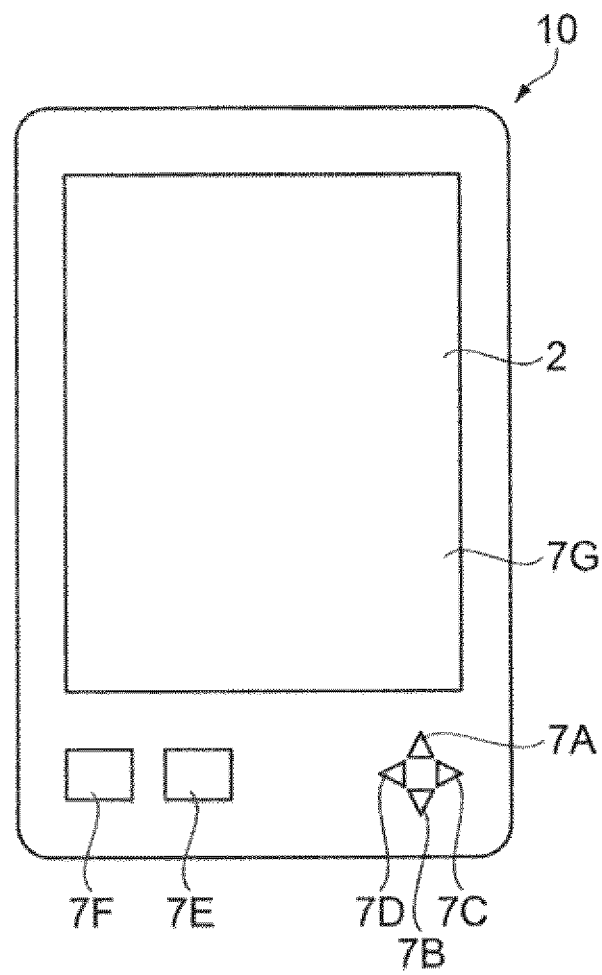
FIG. 1 is a plan view showing the exterior appearance of a viewer according to an embodiment.
Figure 1:
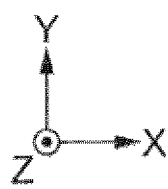

A display method and a display apparatus according to the present disclosure will be described below in detail based on a preferable embodiment shown in the accompanying drawings.

In the embodiment shown below, before describing the display method according to the present disclosure, a viewer that allows a user to view and edit an electronic manual, an electronic book, or a document created by the user, which are each an example of a document containing images, will be described as an example of the display apparatus according to the present disclosure.

In the drawings referred to in the following description, a member or a portion is drawn at longitudinal and lateral scales different from actual scales in some cases for convenience of description and illustration. Further, components other than those necessary for the description are omitted in the drawings in some cases. In the following description, FIGS. 1 and 2A to 2H show axes X, Y, and Z as three axes perpendicular to one another, and the side facing the front end of the arrow representing any of the axes is a "+" side, and the side facing the base end of the arrow is a "−" side for ease of description. The direction along the axis X is called a "lateral direction" as a first direction, the direction along the axis Y is called a "longitudinal direction" as a second direction, and the direction along the axis Z is called a "depth direction." A side of the lateral direction that is the side corresponding to the direction −X is called left or a left side, and a side of the lateral direction that is the side corresponding to the direction +X is called right or a right side. A side of the longitudinal direction that is the side corresponding to the direction −Y is called lower or a lower side, and a side of the longitudinal direction that is the side corresponding to the direction +Y is called upper or an upper side. Out of images so arranged along the direction along the axis X that the images partially overlap with each other, an image located close to the reader (on +Z-axis side) is called an image located on the "upstream," and an image located away from the reader (on −Z-axis side) is called an image located on the "downstream" in the description. In the present embodiment, the first direction is the lateral direction, and the second direction is the longitudinal direction. Instead, the first direction may be the longitudinal direction, and the second direction may be the lateral direction. That is, the first and second directions only need to intersect each other.

Viewer

An overview of a viewer 10 will first be described with reference to FIGS. 1 and 2A.

FIG. 1 is a plan view showing the exterior appearance of the viewer according to the embodiment. FIG. 2A is a partially enlarged plan view showing a thumbnail image bundle and enlarged thumbnail images displayed on an image display section provided in the viewer shown in FIG. 1.

In the present embodiment, the viewer 10 is a display apparatus that displays an image and includes an image display section 2, which displays the image, and buttons 7A to 7F and a touch panel 7G, which serve as an input section 7.

In this example, the viewer 10 is an apparatus for viewing an electronic book as an example of a document, or what is called an electronic book reader. The electronic book is document data containing images of a plurality of pages. The viewer 10 displays the electronic book on a certain unit basis on the image display section 2. The certain unit is, for example, a single page. Among the plurality of pages contained in the electronic book, a page to be displayed is called a selected page. The selected page is changed in accordance with the user's operation performed on any of the buttons 7A to 7F or the touch panel 7G shown in FIG. 1. That is, the user can operate the buttons 7A to 7F or the touch panel 7G to turn a page of the electronic book. The viewer 10 has the function of executing an application program in addition to the function of viewing an electronic book.

Figure 2A:
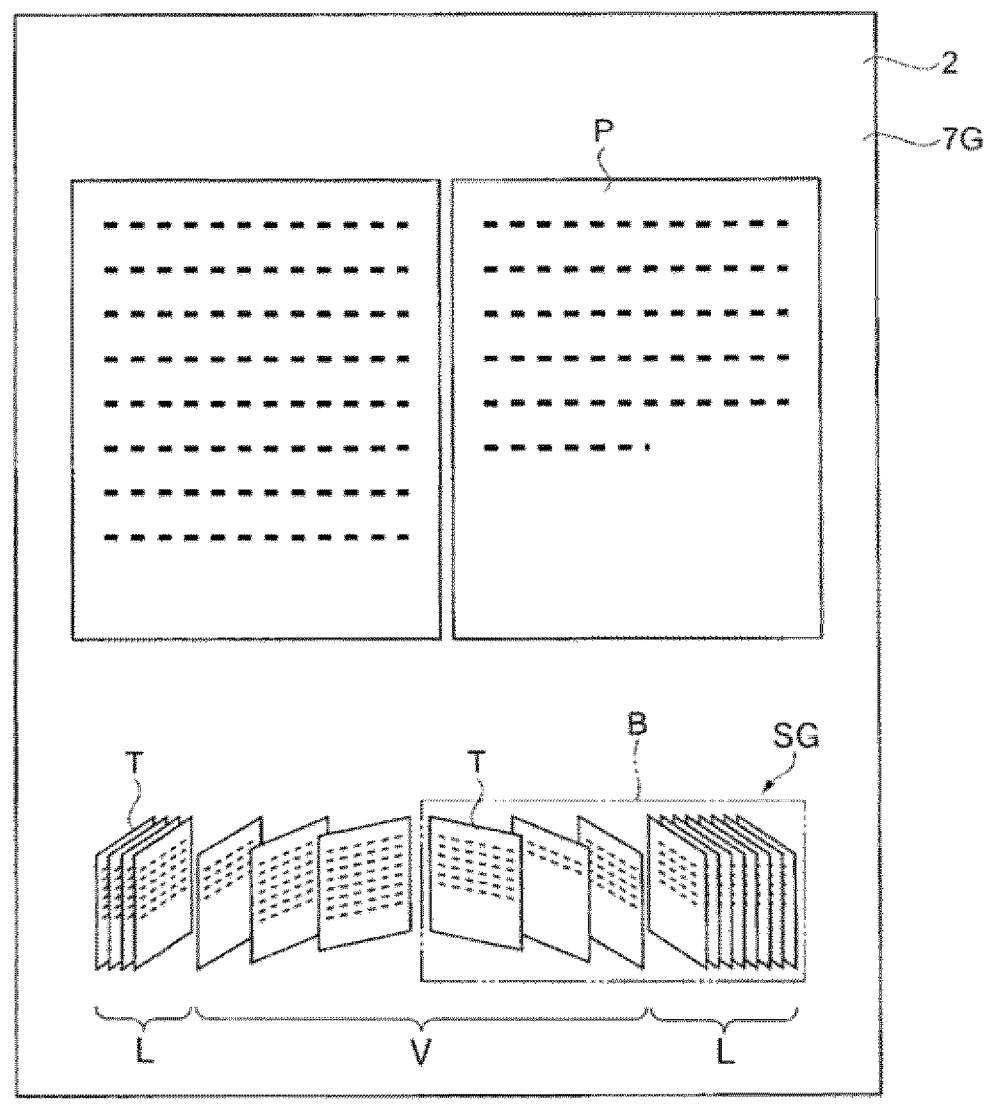
FIG. 2A is a partially enlarged plan view showing a thumbnail image bundle and enlarged thumbnail images displayed on an image display section provided in the viewer shown in FIG. 1.

The image display section 2 displays thumbnail images T as images of reduced pages of an electronic manual, an electronic book, or a document created by the user and further displays an original image P of a selected thumbnail image T, as shown in FIG. 2A. The image display section 2 displays a thumbnail image bundle SG, that is, an image group as an image bundle in which a plurality of thumbnail images T, that is, images are juxtaposed in the lateral direction.

The thumbnail image bundle SG is placed along the lower edge of the image display section 2 in a lower portion of the image display section 2 that is a portion on the lower side of the longitudinal direction, and the lower end of the thumbnail image bundle SG extends off the display region of the image display section 2 in some cases.

The thumbnail images T are images so sized as to occupy part of the image display section 2 and are reduced or enlarged original images P. Each original image P is the image of a page of an electronic manual, an electronic book, or document data created by the user. The original image P may instead be an icon of an application program or an action screen of the application program. The application program and the actions thereof may be allocated to the plurality of thumbnail images T.

The viewer 10 includes the buttons 7A to 7F and the touch panel 7G as the input section 7 on a surface of the viewer 10 that is the surface where the image display section 2 is disposed. The input section 7 externally takes in an input. The input section 7 accepts the user's operation and processes the accepted operation as an input signal. That is, the user operates the input section 7 to input predetermined operation to the viewer 10.

System Configuration of Viewer

The system configuration of the viewer 10 described above will next be described with reference to FIGS. 3 and 4.

Figure 3:
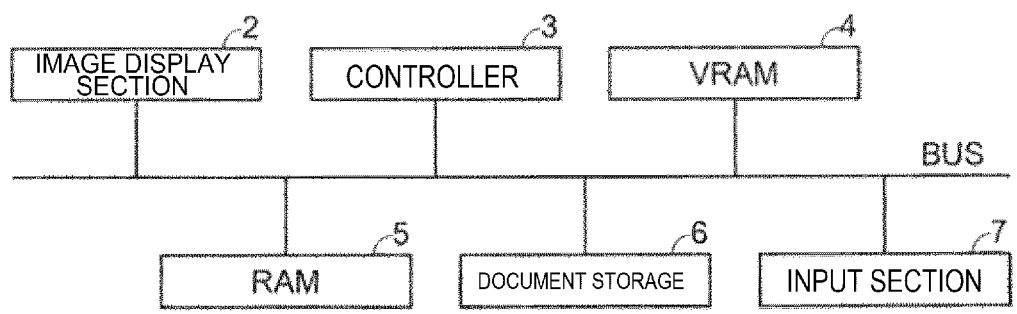
FIG. 3 is a block diagram showing the system configuration of the viewer.
Figure 4:
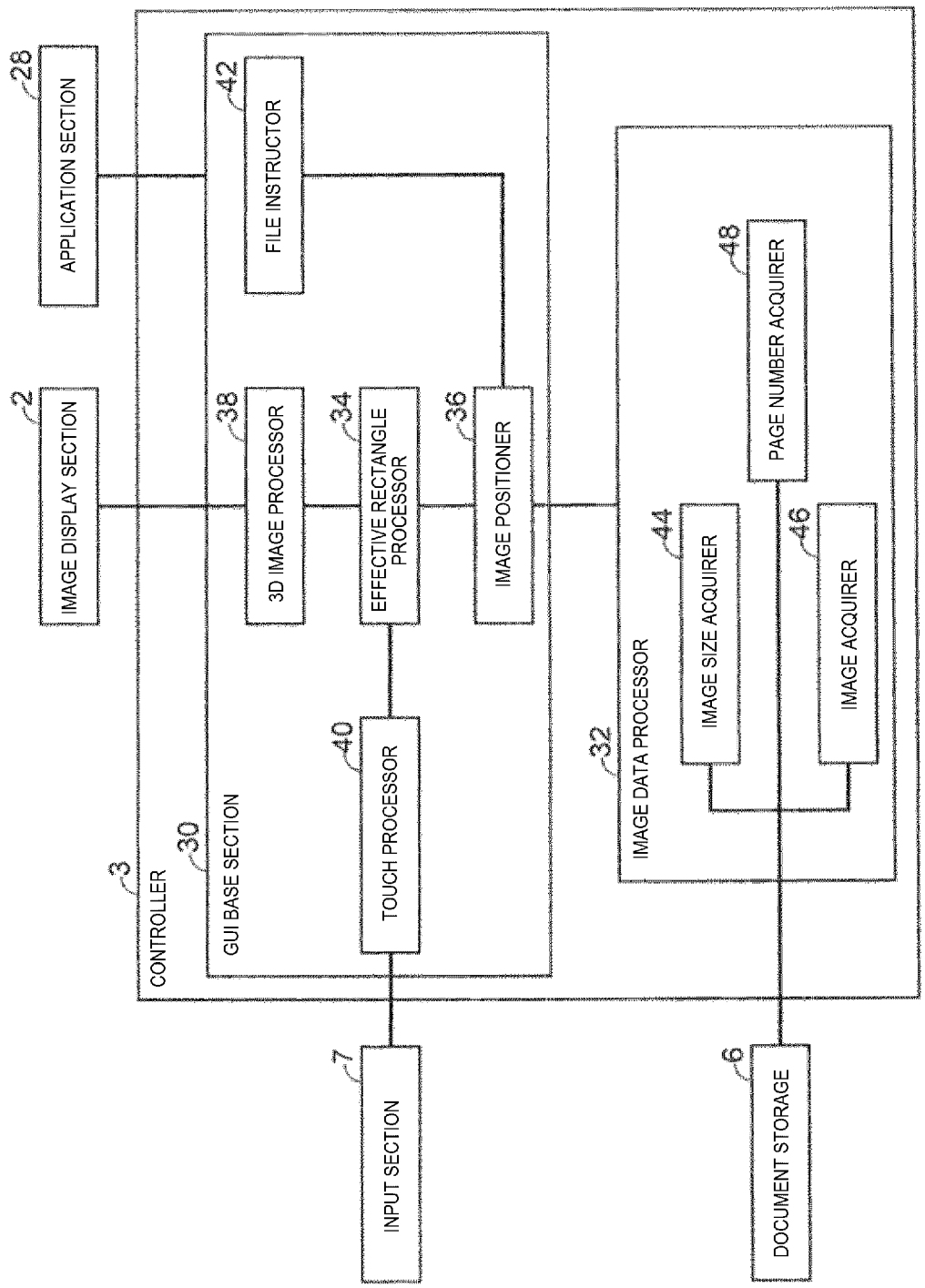
FIG. 4 is another block diagram showing the system configuration of the viewer.

FIGS. 3 and 4 are each a block diagram showing the system configuration of the viewer 10.

The viewer 10 includes the image display section 2, a controller 3, a video random access memory 4 (VRAM), a RAM 5, a document storage 6 (random access memory), and the input section 7, which are coupled to a bus BUS, as shown in FIG. 3. Communication of a signal or information between the portions coupled to the bus BUS is performed via the bus BUS.

The image display section 2 displays the thumbnail images T corresponding to the original images P and the original image P of any of the thumbnail images T. In the present embodiment, the image display section 2 displays the thumbnail image bundle SG, in which a plurality of thumbnail images T are juxtaposed in the lateral direction. The image display section 2 displays the plurality of thumbnail images T in the form of a bird's-eye view of the thumbnail image bundle SG. The image display section 2 displays a bird's-eye image that is an image of the thumbnail image bundle SG which is placed in an imaginary space having a first imaginary rotational axis Q as a first imaginary axis and a second imaginary rotational axis M as a second imaginary axis, as shown in FIG. 9E, which will be described later, and which is viewed from an arbitrary viewpoint in the imaginary space.

The image display section 2 includes a display drive circuit that is not shown but outputs a signal that causes a liquid crystal panel or any other component to display an image, and the image display section 2 displays image data stored in the VRAM 4 as an image containing the thumbnail images T and the original image P described above.

The controller 3 is an apparatus that controls each portion of the viewer 10, for example, a microcomputer including a central processing unit (CPU), a read only memory (ROM), and other components. The CPU executes a program stored in the ROM or the RAM 5 by using the RAM 5 as a work area. The ROM stores, for example, an operating system (OS) program for controlling basic actions of the viewer 10.

The controller 3 controls each portion of the viewer 10 based on the program stored in the ROM. For example, the controller 3 causes the VRAM 4 to store a variety of sets of image data, processes the input signal transmitted from the input section 7 to identify the content of operation performed on any of the buttons 7A to 7F and the touch panel 7G operated by the user, and causes the viewer 10 to operate based on the operated one of the buttons 7A to 7F and the touch panel 7G and the identified content. The controller 3 further controls image processing performed on the images to be displayed on the image display section 2. Examples of the image processing may include enlargement and display of a selected page and enhancement of displayed thumbnail images T.

The VRAM 4 is a memory that stores image data representing an image to be displayed on the image display section 2. The VRAM 4 is a memory that stores developed image data. The image data stored in the VRAM 4 is displayed on the image display section 2.

The RAM 5 is a memory that stores the relationship between the content of the image processing performed by the controller 3 and the image data.

The document storage 6 is a rewritable memory and stores document data, such as an electronic manual, an electronic book, or a document created by the user. The document storage 6 can store a plurality of different sets of document data and allows rewriting of the document data as appropriate. The document storage 6 is a nonvolatile memory that stores a variety of data and application programs in addition to the document data. The document storage 6 may, for example, be a semiconductor memory built in the viewer 10, a detachable external memory, such as an SD memory card, or a database that is communicable over a network, such as the Internet.

The input section 7 includes the buttons 7A to 7F shown in FIG. 1. When any of the buttons 7A to 7F is operated, the input section 7 transmits an input signal corresponding to the operated button to the controller 3. The input section 7 further includes the touch panel 7G.

In the thus configured viewer 10, the controller 3 includes a GUI base section 30, which serves as an image generator, and an image data processor 32, as shown in FIG. 4.

The GUI base section 30 functions as the image generator and rotates a plurality of images T arranged along the first imaginary rotational axis Q around the second imaginary rotational axis M, which intersects the first imaginary rotational axis Q, and further rotates the plurality of images T around the first imaginary rotational axis Q to create thumbnail images T. The GUI base section 30 creates a bird's-eye image that is an image of the thumbnail image bundle SG placed in the imaginary space and viewed from an arbitrary viewpoint in the imaginary space.

The GUI base section 30 includes an effective rectangle processor 34, an image positioner 36, a 3D image processor 38, a touch processor 40, and a file instructor 42.

The effective rectangle processor 34 sets a thumbnail image display region as an occupation region.

The image positioner 36 determines an angle of rotation θ by which the thumbnail images T are rotated around the second imaginary rotational axis M. The GUI base section 30 creates the thumbnail images T based on the determined angle of rotation θ.

The image positioner 36 divides the thumbnail image bundle SG, that is, the image group formed of the plurality of thumbnail images T into a static section L, that is a dense region, where thumbnail images T are arranged densely with equal gaps therebetween with adjacent thumbnail images T partially overlapping each other, and a dynamic section V, where the gaps between adjacent thumbnail images T are greater than the gaps between adjacent thumbnail images T in the static section L, that is, a sparse region where the thumbnail images T are more sparsely arranged than in the dense region, and the image positioner 36 calculates a standard page interval common to the static section L, that is the dense region, and the dynamic section V, that is, the sparse region.

The image positioner 36 calculates the width of a spread page and the width excluding the portion occupied by the standard page intervals between the pages and the width of the spread page from the width of the entire image and divided by the pages in the dynamic section V.

The image positioner 36 performs the calculation described above to determine the arrangement orders of the plurality of thumbnail images T, which form the thumbnail image bundle SG.

The 3D image processor 38 displays the thumbnail images T on the image display section 2 based on the arrangement orders, which have been determined by the image positioner 36, of the plurality of thumbnail images T, which form the thumbnail image bundle SG. That is, the 3D image processor 38 displays the thumbnail image bundle SG.

The 3D image processor 38 is formed, for example, of a FrameBuffer or a GPU.

The touch processor 40 detects the user's operation of touching the touch panel 7G. The touch processor 40 acquires a touch signal from the touch panel 7G. In response to the user's instruction based on the touch signal, the touch processor 40 deforms as required the thumbnail image bundle SG determined by the image positioner 36 and then forwards the thumbnail image bundle SG to the 3D image processor 38.

The file instructor 42 instructs the image data processor 32 to read the original image P of a page of document data based on the data supplied from the touch processor 40. The file instructor 42 is, for example, a function of Android (registered trademark), which is an operating system for mobile instruments.

The image data processor 32 is, for example, a PDF library.

The image data processor 32 includes an image size acquirer 44, an image acquirer 46, and a page number acquirer 48.

The image size acquirer 44 acquires the lateral length of the original image P of the page of the document data from the document storage 6. The image size acquirer 44 further acquires the longitudinal length of the original image P of the page of the document data from the document storage 6.

The image acquirer 46 acquires the original image P of the page of the document data, other attributes of the original image P, and information on the original image P from the document storage 6.

The information on the original image P includes information on the plurality of thumbnail images T, which form the thumbnail image bundle SG, and further includes information on the arrangement orders of the thumbnail images T used when the thumbnail image bundle SG, that is, the image group is formed. That is, the image acquirer 46 acquires the original image P and the thumbnail image bundle SG, which includes the thumbnail images T and in which the arrangement orders of the thumbnail images T are determined in advance.

The page number acquirer 48 acquires the number of pages of the document data from the document storage 6.

An application section 28 is, for example, application software, such as software for printing a photograph, a document, and other objects, software for printing new-year's cards, and software for projecting a photograph, a document, and other objects via a projector.

Action of Viewer

The action of the aforementioned viewer will next be described with reference to FIGS. 2A to 2H and FIGS. 5 to 15.

Specifically, the action of the viewer that shows the thumbnail image bundle SG having the dynamic section V and the static section L and moves one selected image selected from the thumbnail images T located in the dynamic section V to a predetermined destination in the static section L.

Figure 8:
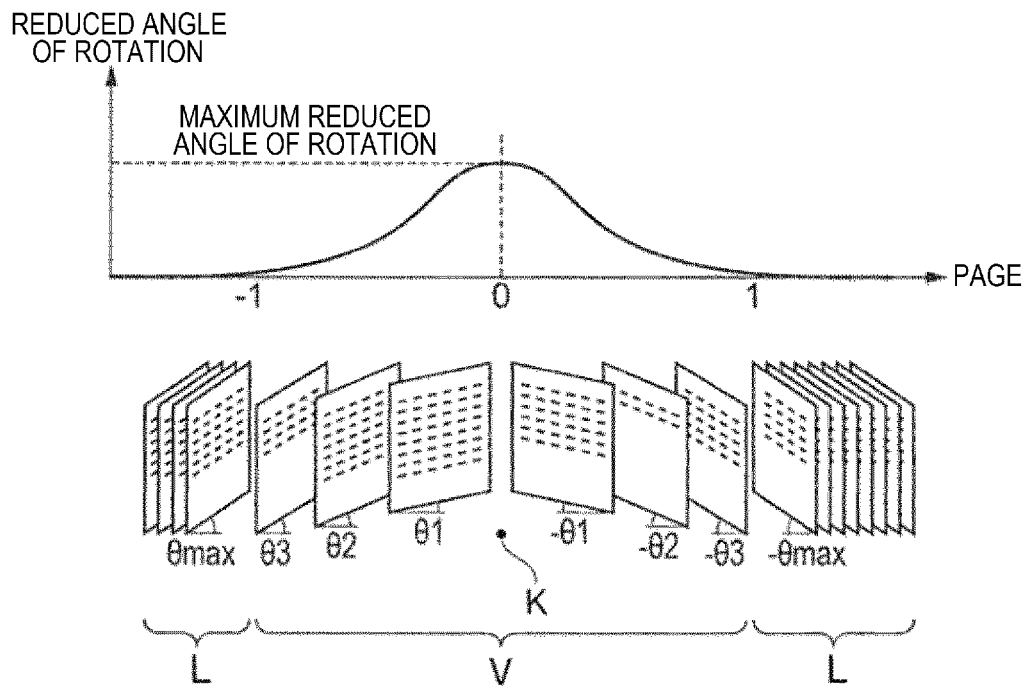
FIG. 8 describes the process of determining an angle of rotation.
Figure 10A:
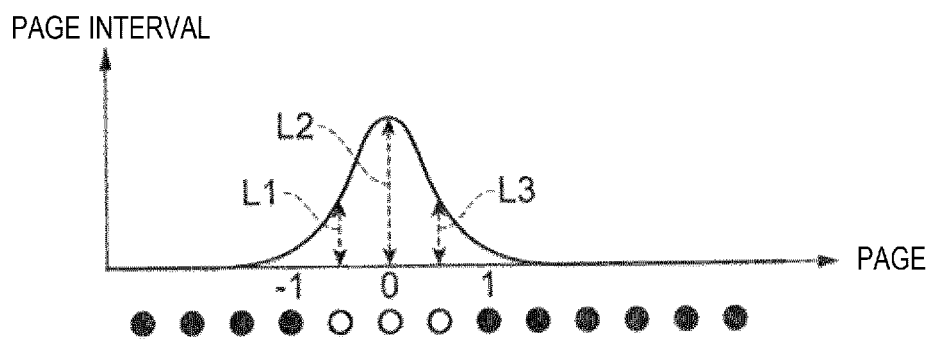
FIG. 10A describes a method for arranging the thumbnail images.
Figure 10B:
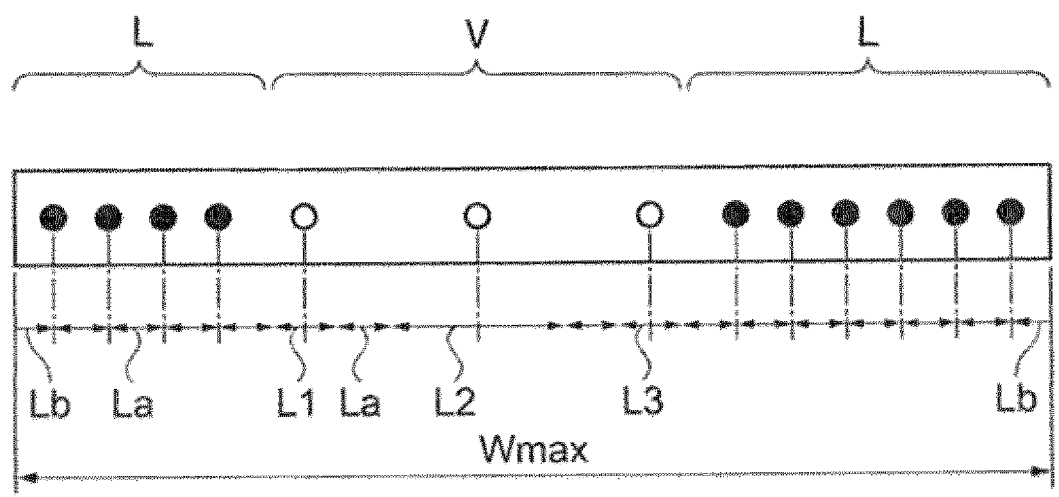
FIG. 10B describes the method for arranging the thumbnail images.
Figure 10C:
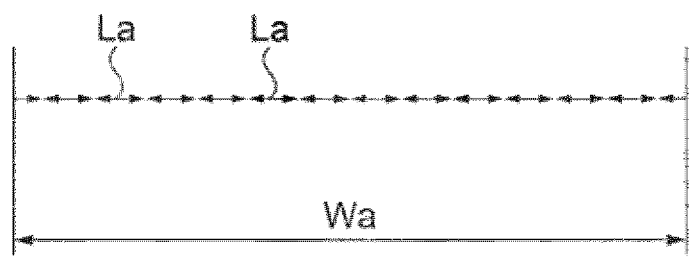
FIG. 10C describes the method for arranging the thumbnail images.
Figure 11:
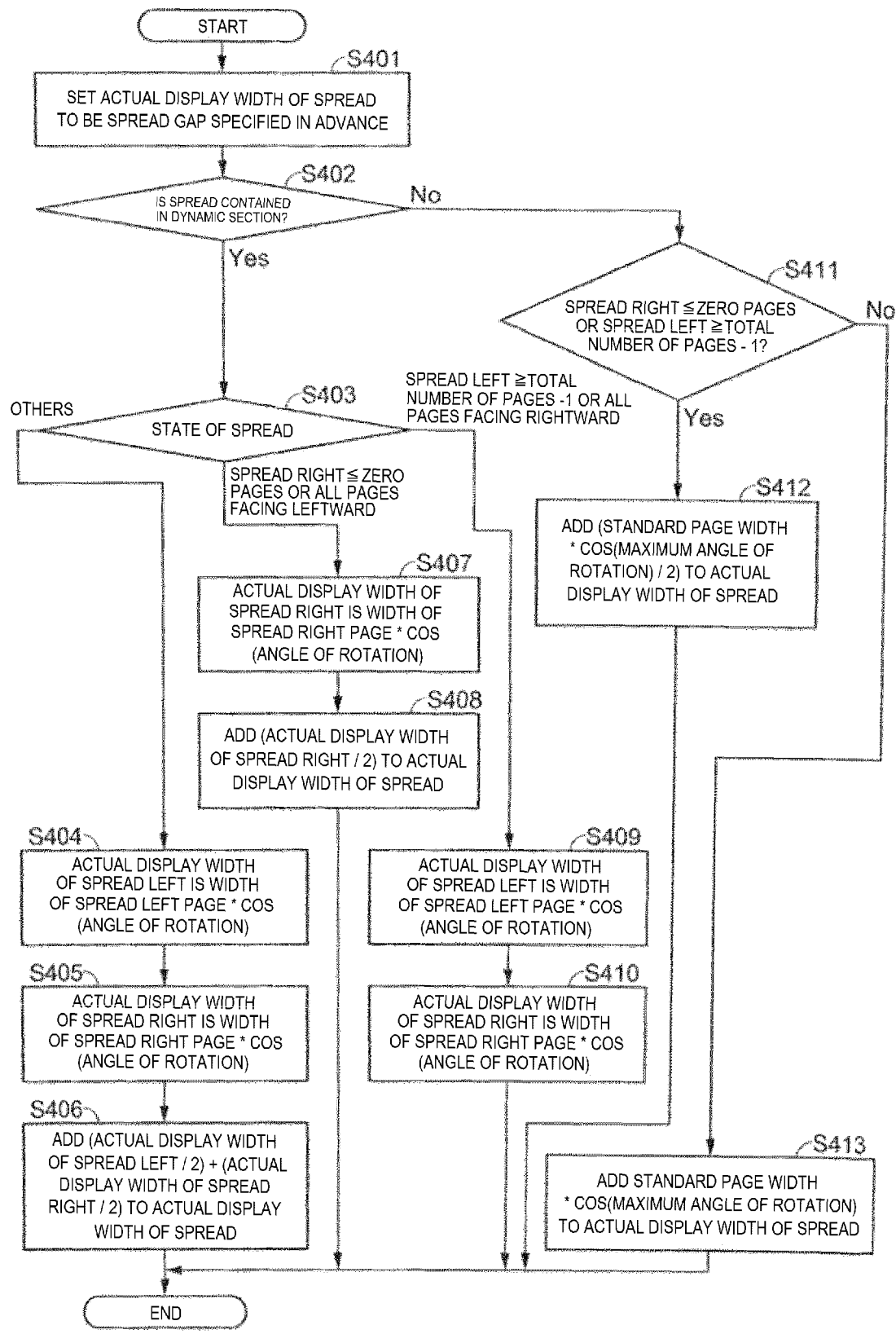
FIG. 11 is a flowchart showing an example of processes carried out by the viewer.
Figure 12:
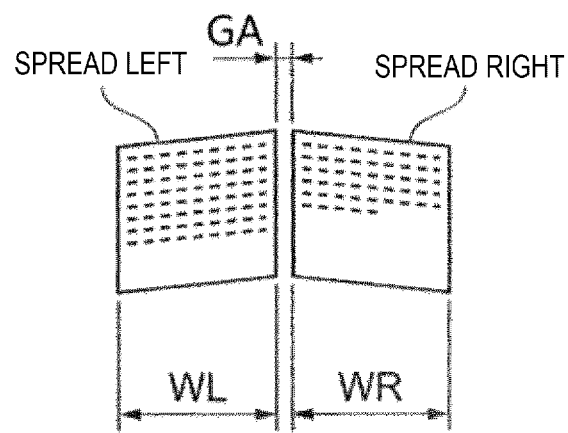
FIG. 12 describes a spread.
Figure 13:
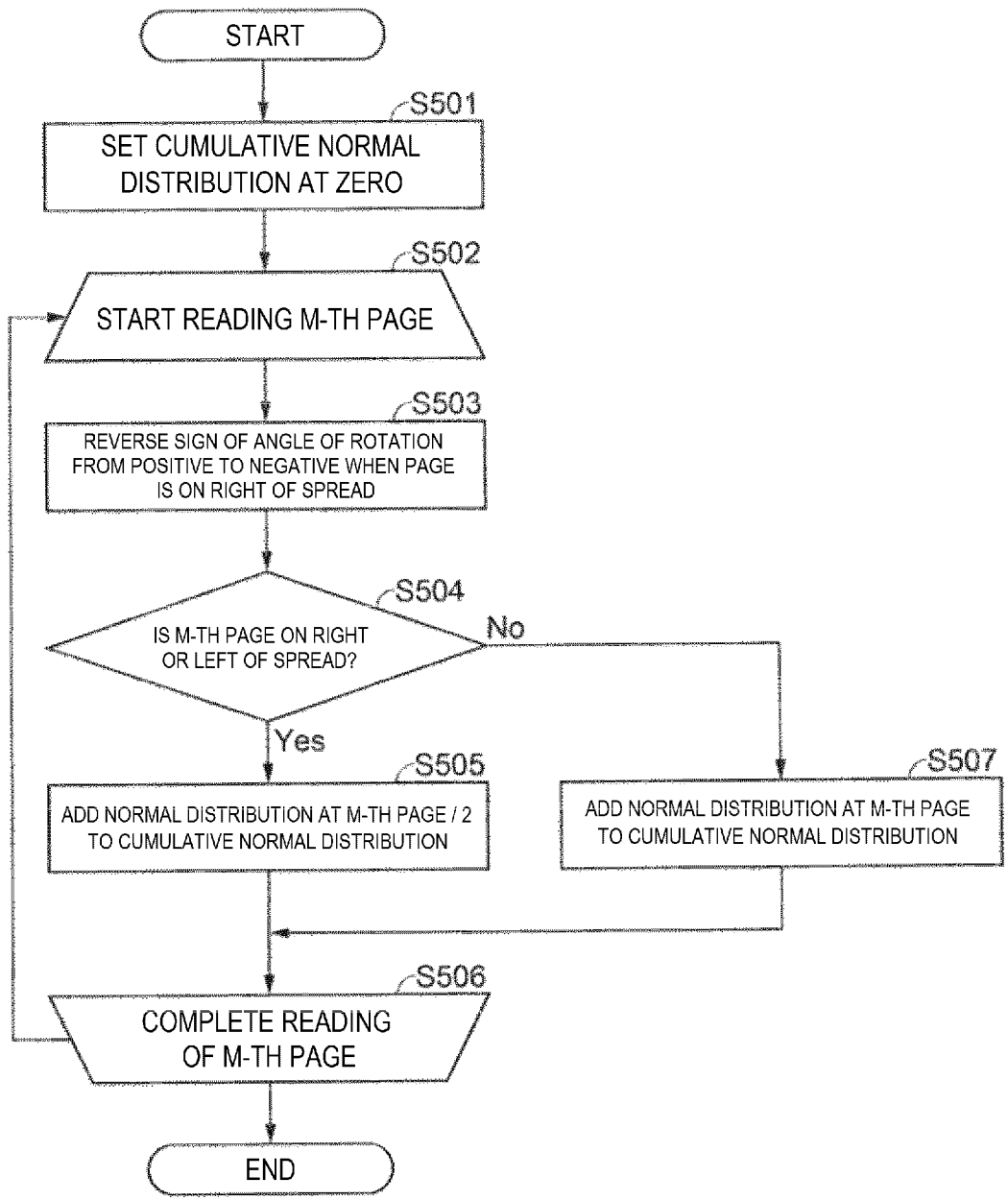
FIG. 13 is a flowchart showing an example of processes carried out by the viewer.
Figure 14:
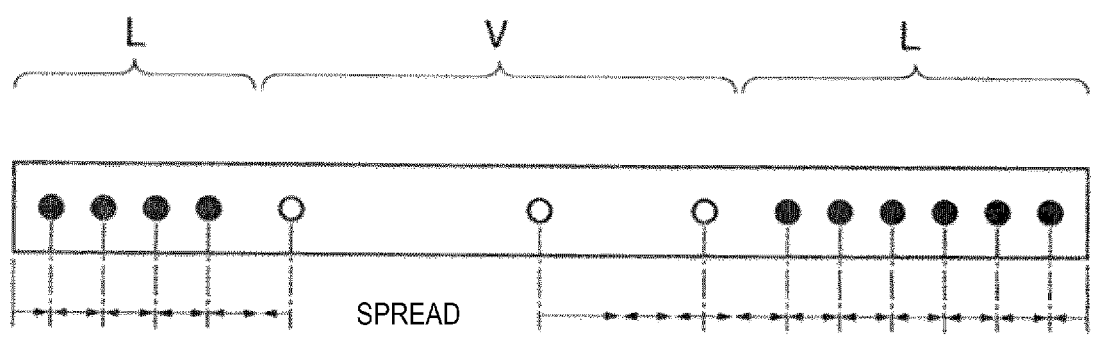
FIG. 14 describes a method for placing the spread in a dynamic section.

FIGS. 2B to 2H are partially enlarged plan views in which a portion B of the thumbnail image bundle shown in FIG. 2A is partially enlarged and which describe a display method used when the selected thumbnail image is moved to the destination. FIGS. 5, 6, 7, 11, 13, and 15 are flowcharts showing an example of processes carried out by the viewer 10. FIG. 8 describes the process of determining the angle of rotation θ. FIGS. 9A to 9E describe the process of generating thumbnail images. FIGS. 10A to 10C describe a method for arranging the thumbnail images. FIG. 12 describes a spread. FIG. 14 describes a method for placing the spread in the dynamic section.

The action of the controller 3 will first be described below along the flowchart shown in FIG. 5 with reference to FIGS. 2A to 2H.

The controller 3 creates the thumbnail image bundle SG in which the generated thumbnail images T are arranged at predetermined orders.

The image positioner 36 divides the thumbnail image bundle SG into the static section L and the dynamic section V and calculates the positions where the thumbnail images T are arranged in the static section L and the positions where the thumbnail images T are arranged in the dynamic section V to determine the positions where the plurality of thumbnail images T that form the thumbnail image bundle SG are arranged.

Figure 5:
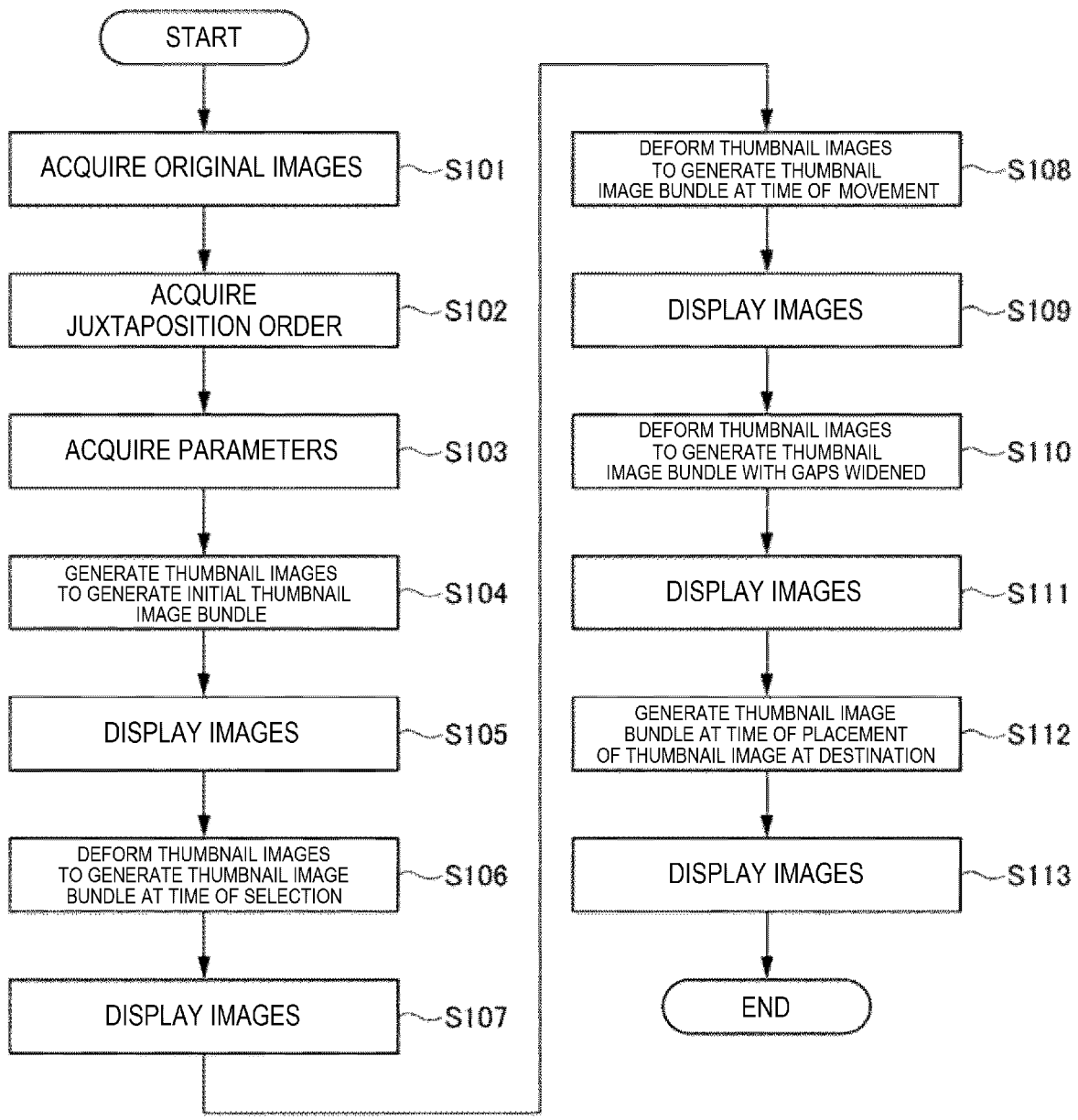
FIG. 5 is a flowchart showing an example of processes carried out by the viewer.

The procedure shown in FIG. 5 starts in response to a trigger, for example, when a predetermined event occurs, for example, when the viewer 10 is powered on or when the viewer 10 is instructed, for example, to display a menu screen.

First, in step S101, the file instructor 42 instructs the image acquirer 46 to read an original image P specified by the user who uses any of the buttons 7A to 7F or the touch panel 7G of the input section 7 from the document storage 6. The controller 3, that is, the image acquirer 46 then acquires the thumbnail image bundle SG to be processed, in this example, the original images P of the plurality of images T contained in the thumbnail image bundle SG.

In step S102, the controller 3, that is, the image acquirer 46 then acquires data representing the sequence in accordance with which the plurality of images T are juxtaposed.

The data contains numbers representing the juxtaposition sequence of the thumbnail images T and file names as identifiers of the thumbnail images T. The data are stored in the document storage 6. In step S101, the controller 3 reads the data from the document storage 6 and acquires the original images P having the file names contained in the data from the document storage 6. In step S102, the controller 3 then acquires from the data the determined juxtaposition positions, that is, arrangement positions of the thumbnail images T in the thumbnail image bundle SG. That is, the controller 3 acquires an initial thumbnail image bundle SG which is stored in the document storage 6 and in which the arrangement positions of the thumbnail images T are determined in advance.

In step S103, the controller 3 then acquires parameters used to display the initial thumbnail image bundle SG. The parameters are stored in the document storage 6 along with the identifiers of the initial thumbnail image bundle SG. The acquired parameters include the number of images and an image width. The number of images is the parameter representing the number of thumbnail images TT contained in the thumbnail image bundle SG. The image width is the parameter representing the lateral length of the thumbnail image bundle SG.

In step S104, the controller 3 then creates the initial thumbnail image bundle SG by using the thumbnail images T generated by the GUI base section 30. In detail, the controller 3 reduces or enlarges the original images P acquired in step S101 by the GUI base section 30 and creates the initial thumbnail image bundle SG by using the generated thumbnail images T.

Figure 6:
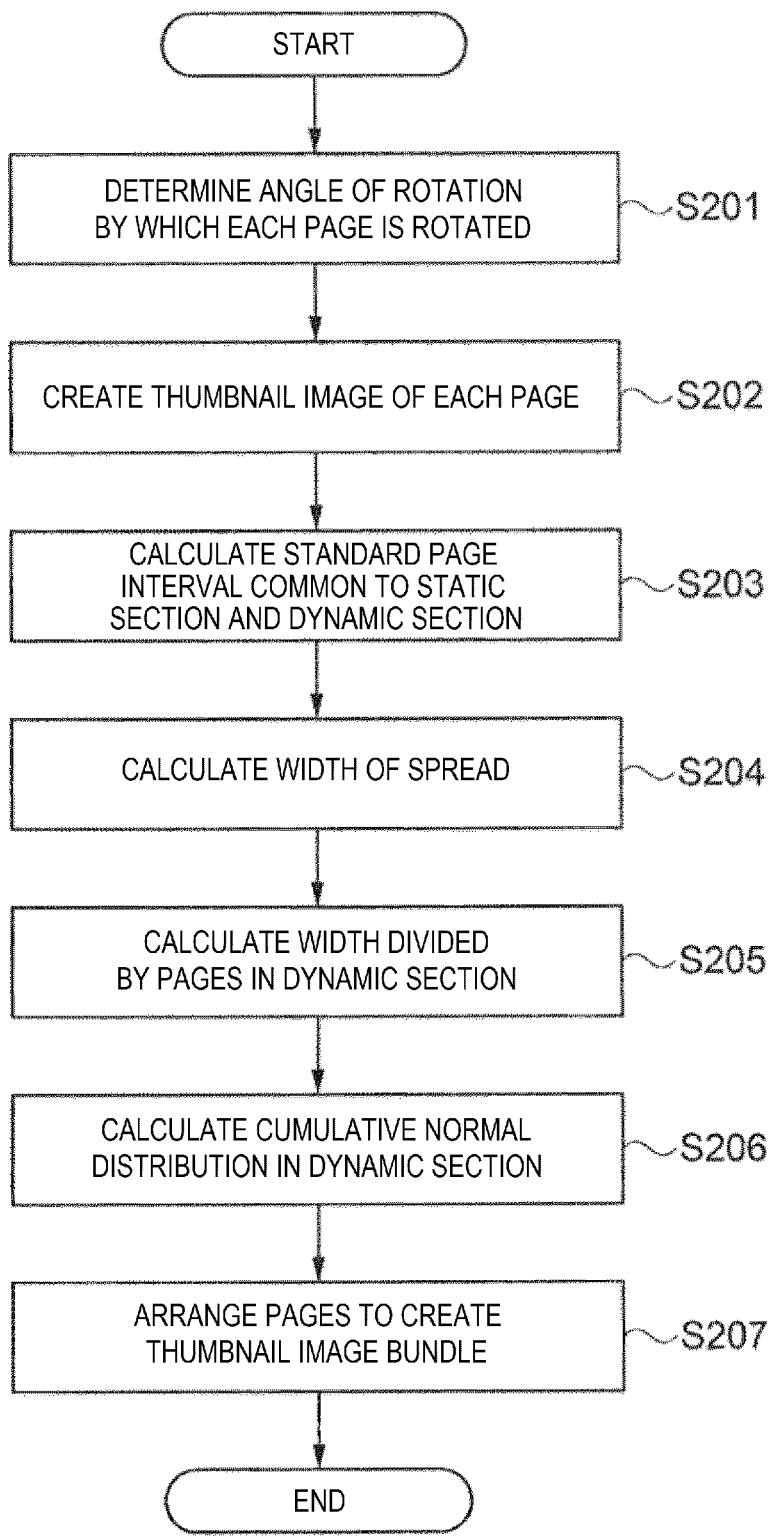
FIG. 6 is a flowchart showing an example of processes carried out by the viewer.
Figure 7:
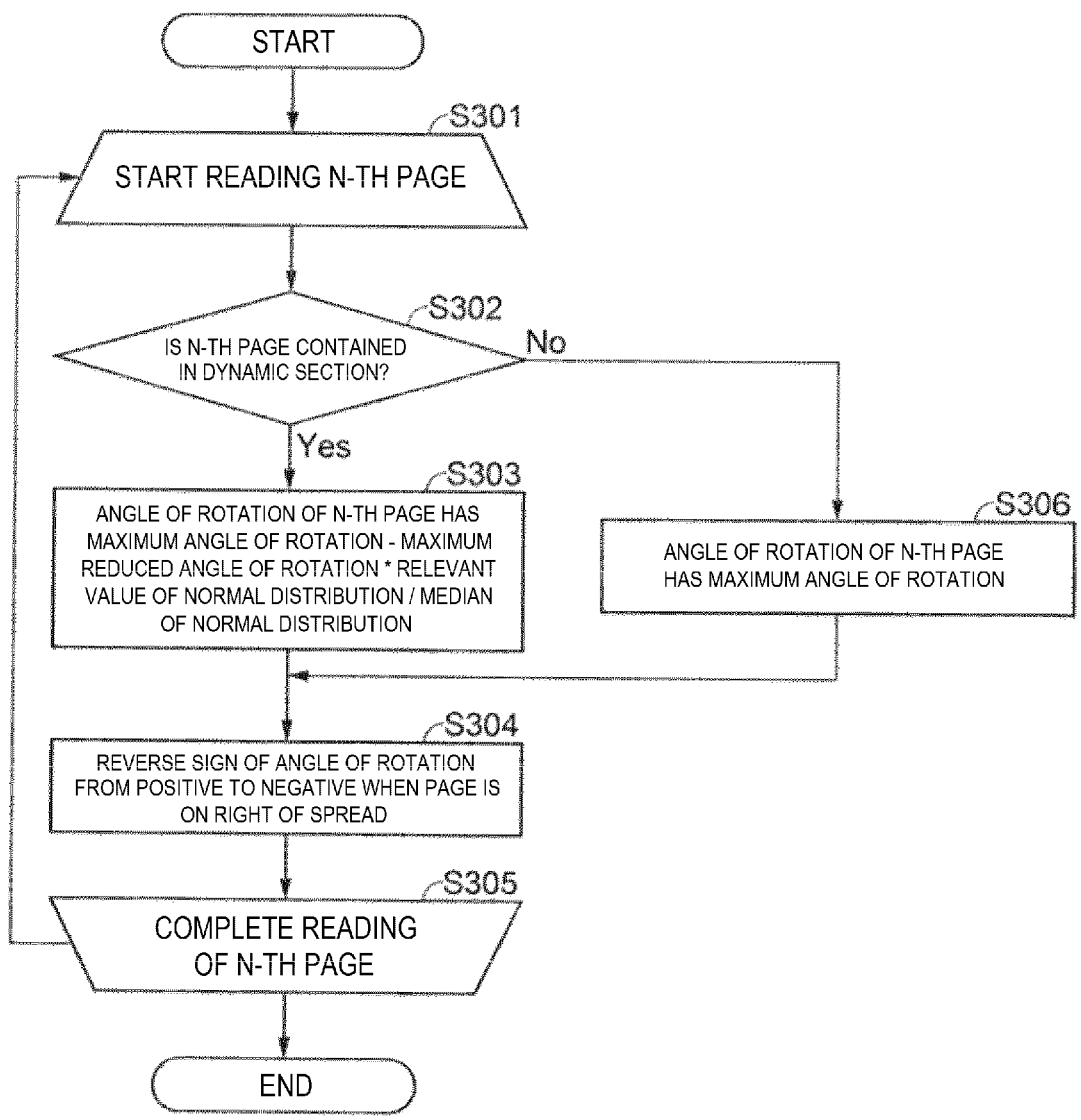
FIG. 7 is a flowchart showing an example of processes carried out by the viewer.

The action of the controller 3 that creates the thumbnail images T and arranges the thumbnail images T to create the initial thumbnail image bundle SG will be described below along the flowchart of FIG. 6. In the following description, the "initial thumbnail image bundle SG" stored in the document storage 6 is referred simply to as the "thumbnail image bundle SG" in some cases.

In step S201, the image positioner 36 first determines an angle of inclination by which a pair of edges facing each other out of the four edges of each of the thumbnail images T, which each has a quadrangular shape and are displayed in the thumbnail image bundle SG, incline. Specifically, in step S201, the image positioner 36 determines the angle of rotation θ, by which each page having an oblong shape and shown in FIG. 9A, which will be described later, is rotated around the second imaginary rotational axis M. That is, the image positioner 36 determines the angle of inclination, that is, the angle of rotation θ, by which the upper and lower edges, which face the Y-axis direction, of each of the thumbnail images T, which each have an oblong shape, incline with respect to the axis X. The action of determining the angle of rotation θ will be described along the flowchart of FIG. 7.

In step S301, the image positioner 36 first starts reading the N-th original image P. N is an integer greater than or equal to one.

In step S302, when the N-th page is not contained in the dynamic section V, the result of step S302 is "No," and the image positioner 36 proceeds to step S306, where the image positioner 36 sets the angle of rotation θ by which the N-th page is rotated at a maximum angle of rotation θmax and proceeds to step S304. When the N-th page is contained in the dynamic section V, the result of step S302 is "Yes," and the image positioner 36 proceeds to step S303, where the image positioner 36 sets the angle of rotation θ by which the N-th page is rotated at a value defined by "maximum angle of rotation−maximum reduced angle of rotation*relevant value of normal distribution/median of normal distribution." The angle of rotation θ of a page placed in the dynamic section V is calculated in accordance with the normal distribution of the reduced angle of rotation, as shown in FIG. 8. The closer to a predetermined position K, which is the lateral center of the dynamic section V, the page is, the smaller the angle of rotation θ is. That is, the following expression is satisfied: angle of rotation θ1 of page closest to predetermined position K<angle of rotation θ2 of page close in second place to predetermined position K<angle of rotation θ3 of page close in third place to predetermined position K.

In step S304, the image positioner 36 then reverses the sign of the angle of rotation θ from positive to negative when the page is on the right of the spread. That is, the pages on the right of the predetermined position K are so set as to have angles of rotation −θ1, −θ2, −θ3, and −θmax.

In step S305, the image positioner 36 then returns to step S301, repeats the actions in steps S301 to S305 until the image positioner 36 reads the (N−1) page, completes the reading of the N-th page, and terminates the setting of the angle of rotation θ of each page.

Referring back to FIG. 6, in step S202, the controller 3 creates the thumbnail image T of each page. Specifically, the GUI base section 30 rotates each of the plurality of thumbnail images T arranged along the first imaginary rotational axis Q around the second imaginary rotational axis M, which intersects the first imaginary rotational axis Q, and further rotates the thumbnail image T around the first imaginary rotational axis Q to create the thumbnail image T.

Figure 9A:
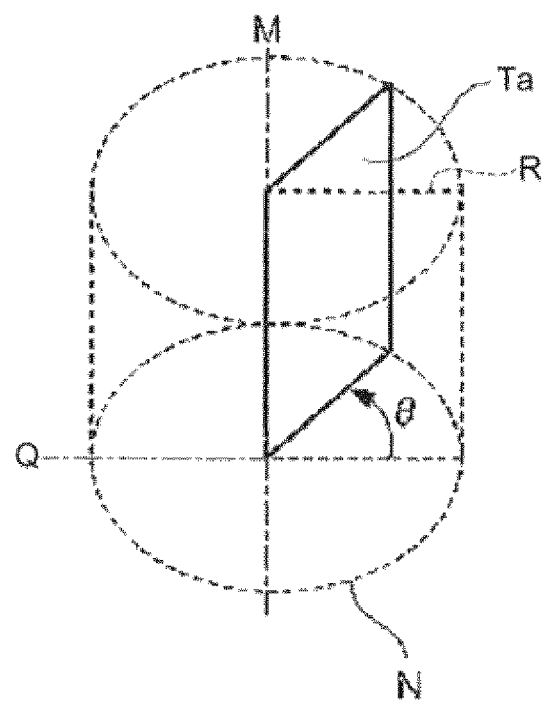
FIG. 9A describes the process of generating a thumbnail image.

That is, the GUI base section 30 places a page Ta in such a way that the page Ta stands on the first imaginary rotational axis Q set in an imaginary horizontal plane N in the imaginary space and rotates the page Ta by the angle of rotation θ from a reference position R, where the lateral direction of the page Ta is parallel to the lateral direction of the display region, around the second imaginary rotational axis M, which intersects the first imaginary rotational axis Q, as shown in FIG. 9A. Further, the GUI base section 30 creates an image by rotating the page Ta rotated around the second imaginary rotational axis M in the imaginary space by an angle of depression ϕ, which is not shown, around the first imaginary rotational axis Q. That is, the GUI base section 30 creates an image that is the page Ta rotated around the second imaginary rotational axis M and obliquely viewed down at the angle of depression ϕ, which is not shown, from a viewpoint above the upper edge of the page Ta in the imaginary space. In other words, the thumbnail images are each generated in the form of a bird's-eye image that is the page Ta obliquely viewed at the angle of depression ϕ, which is not shown, from a viewpoint above the upper edge of the page Ta in the imaginary space. Before the page is rotated, the lateral direction of the page is parallel to the lateral direction of the display region, and the angle of rotation θ is 0°. The angle of depression ϕ is an angle specified in advance. The second imaginary rotational axis M is not necessarily parallel to the edges of the page in the second direction, which is the longitudinal direction, and may instead intersect the lateral edges of the page.

Figure 9B:
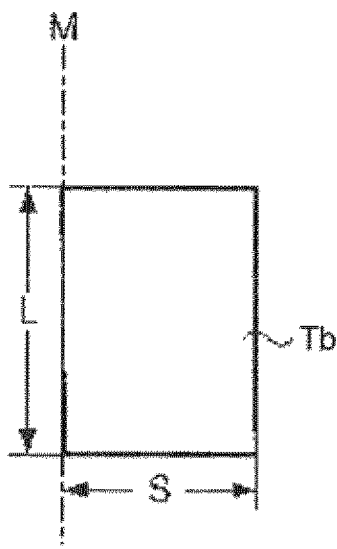
FIG. 9B describes the process of generating the thumbnail image.
Figure 9C:
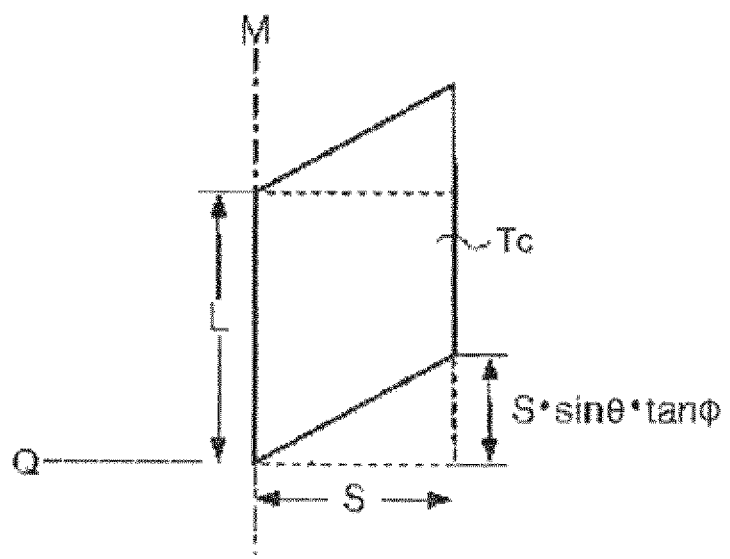
FIG. 9C describes the process of generating the thumbnail image.
Figure 9D:
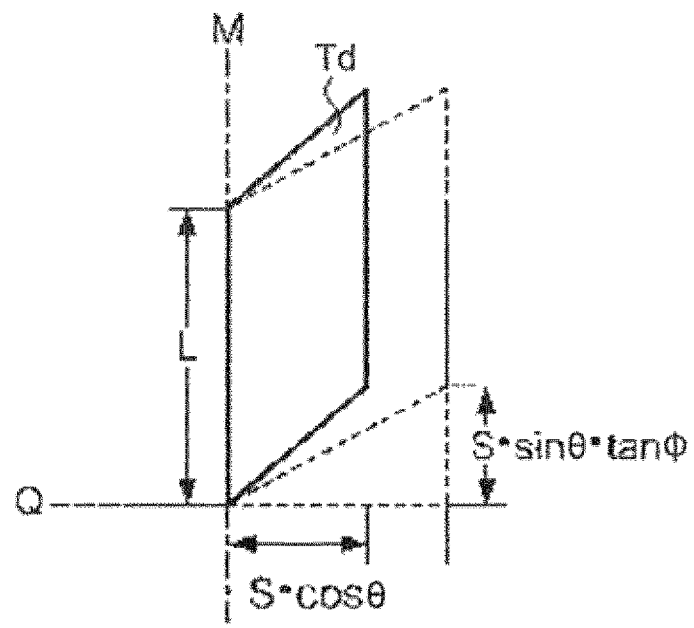
FIG. 9D describes the process of generating the thumbnail image.
Figure 9E:
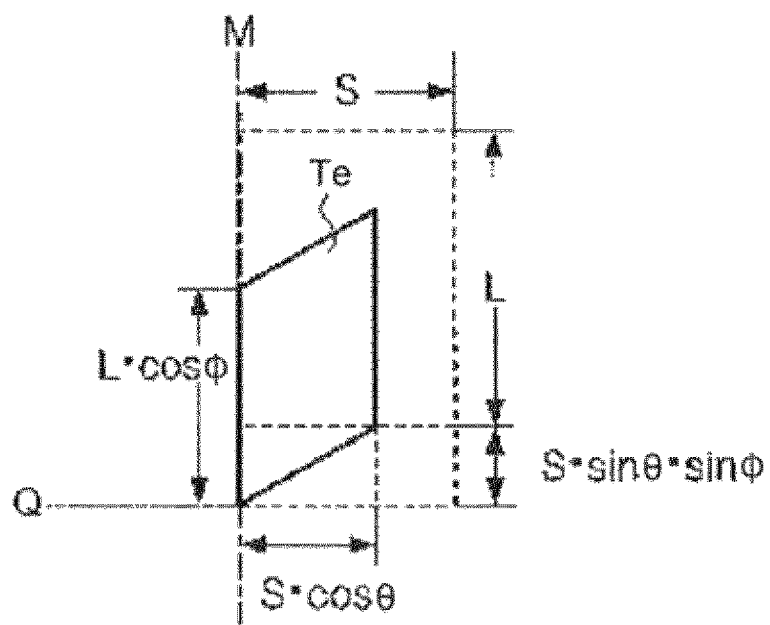
FIG. 9E describes the process of generating the thumbnail image.

Specifically, the GUI base section 30 first deforms an image Tb shown in FIG. 9B, which is an image of each page viewed from the front, in the longitudinal direction with the lateral width of the image Tb unchanged in such a way that the right edge of the image Tb in FIG. 9B is shifted relative to the left edge thereof by S·sin θ·tan ϕ to generate an image Tc, as shown in FIG. 9C. The GUI base section 30 then creates an image Td, which is the image Tc in FIG. 9C reduced in size in the lateral direction by a factor of cos θ, as shown in FIG. 9D. As a result, the lateral width of the image Td is S·cos θ. Thereafter, the GUI base section 30 finally creates an image Te, which is the image Td in FIG. 9D reduced in size in the longitudinal direction by a factor of cos ϕ, as shown in FIG. 9E. As a result, the longitudinal dimension of the image Te is L·cos ϕ. The thus generated thumbnail image T is an image of the page rotated by the angle of rotation θ around the second imaginary rotational axis M and further rotated around the first imaginary axis rotational Q. In other words, the generated thumbnail image T is an image of the page rotated around the second imaginary rotational axis M by the angle of rotation θ and viewed down at the angle of depression ϕ from a viewpoint above the upper edge of the page.

Referring back to FIG. 6 again, in step S203, the image positioner 36 calculates a standard page interval La common to the dynamic section V and the static section L.

The standard page interval La is calculated by "overall occupation width*standard page interval occupation width ratio/(number of pages−1)." When the page interval follows the normal distribution shown in FIG. 10A, the page interval in the static section L is the standard page interval La, and the page interval in the dynamic section V varies as follows: the standard page interval La; a page interval L1; the standard page interval La; a page interval L2; the standard page interval La; a page interval L3; and the standard page interval La, as shown in FIG. 10B. The overall occupation width is a length Wmax formed of the sum of the page intervals in the static section L and the sum of the page intervals in the dynamic section V to which two page intervals Lb at opposite ends are added, the page intervals Lb each corresponding to half of "standard page width*cos (maximum angle of rotation θmax)." The standard page interval occupation width ratio is the ratio of a length Wa of the standard page interval occupation width excluding the page intervals L1, L2, and L3 in the dynamic section V to the length Wmax of the overall occupation width, as shown in FIG. 10C.

In step S204, the image positioner 36 then calculates the width of the spread. The spread is two thumbnail images T that sandwich the predetermined position K in the dynamic section V shown in FIG. 8.

The action of the image positioner 36 that calculates the width of the spread will be described below along the flowchart of FIG. 11.

In step S401, the image positioner 36 first sets the actual display width of the spread to be a spread gap GA specified in advance. The spread gap GA is the gap between the spread right page and the spread left page, as shown in FIG. 12. The spread right means the right of the spread, and the spread left means the left of the spread.

Thereafter, in step S402, when the spread is contained in the dynamic section V, the result of step S402 is "Yes," and the image positioner 36 proceeds to step S403. In step S403, when the state of the spread is "others," which is not "spread≥left total number of pages −1 or all pages facing rightward" or "spread right≤zero pages or all pages facing leftward", the image positioner 36 proceeds to step S404, where the image positioner 36 sets an actual display width WL of the spread left to be "width of spread left page*cos (angle of rotation θ)." The phrase "all pages facing rightward" means a case where all pages are each "spread left" in FIG. 12, and the phrase "all pages facing leftward" means a case where all pages are each "spread right" in FIG. 12.

In step S405, the image positioner 36 then sets an actual display width WR of the spread right WR to be "width of spread right page*cos(angle of rotation θ)."

In step S406, the image positioner 36 then adds "(actual display width WL of spread left/2)+(actual display width WR of spread right/2)" to the actual display width of the spread and terminates the calculation of the actual display width of the spread.

Returning to step S403, when the state of the spread is "spread right≤zero pages or all pages facing leftward," the image positioner 36 proceeds to step S407, where the image positioner 36 sets the actual display width WR of the spread right to be "width of spread right page*cos (angle of rotation θ)."

In step S408, the image positioner 36 then adds "(actual display width WR of spread right/2)" to the actual display width of the spread and terminates the calculation of the actual display width of the spread.

Returning to step S403 again, when the state of the spread is "spread left≥total number of pages −1 or all pages facing rightward," the image positioner 36 proceeds to step S409, where the image positioner 36 sets the actual display width WL of the spread left to be "width of spread left page*cos (angle of rotation θ)."

In step S410, the image positioner 36 then adds "(actual display width WL of spread left/2)" to the actual display width of the spread and terminates the calculation of the actual display width of the spread.

Thereafter, returning to step S402, when the spread is not contained in the dynamic section V, the result of step S402 is "No," and the image positioner 36 proceeds to step S411. In step S411, when the state of the spread is "spread right≤zero pages or spread left total number of pages −1," the result of step S411 is "Yes," and the image positioner 36 proceeds to step S412.

In step S412, the image positioner 36 adds "standard page width*cos(maximum angle of rotation θmax)/2" to the actual display width of the spread and terminates the calculation of the actual display width of the spread.

Thereafter, returning to step S411, when the state of the spread is not "spread right zero pages or spread left≥total number of pages −1," the result of step S411 is "No," and the image positioner 36 proceeds to step S413. In step S413, the image positioner 36 adds "standard page width*cos(maximum angle of rotation θmax)" to the actual display width of the spread and terminates the calculation of the actual display width of the spread.

Referring back to FIG. 6 again, in step S205, the image positioner 36 calculates the width divided by the pages in the dynamic section V.

The width divided by the pages in the dynamic section is calculated by "overall occupation width*(1−standard page interval occupation width ratio)−actual display width of spread." The overall occupation width is the length Wmax formed of the sum of the page intervals in the static section L and the sum of the page intervals in the dynamic section V to which one page interval in the static section L is added, as described above. The standard page interval occupation width ratio is the ratio of the length Wa of the standard page interval occupation width to the length Wmax of the overall occupation width.

In step S206, the image positioner 36 then calculates a cumulative normal distribution in the dynamic section V.

The action of the image positioner 36 that calculates the cumulative normal distribution in the dynamic section V will be described below along the flowchart of FIG. 13.

In step S501, the image positioner 36 first sets the cumulative normal distribution at "0".

In step S502, the image positioner 36 then starts reading the M-th page in the dynamic section V. M is an integer greater than or equal to one.

In step S503, the image positioner 36 then reverses the sign of the angle of rotation θ from positive to negative when the page is on the right of the spread.

Thereafter, in step S504, when the M-th page is on the right or left of the spread, the result of step S504 is "Yes," and the image positioner 36 proceeds to step S505. In step S505, the image positioner 36 adds "normal distribution at M-th page/2" to the cumulative normal distribution.

In step S506, the image positioner 36 then completes the reading of the M-th page and terminates the calculation of the cumulative normal distribution.

Returning to step S504, when the M-th page is not on the right or left of the spread, the result of step S504 is "No," and the image positioner 36 proceeds to step S507. In step S507, the image positioner 36 adds "normal distribution at M-th page" to the cumulative normal distribution.

In step S506, the image positioner 36 then returns to step S502, repeats the actions insteps S502 to S506 multiple times corresponding to the number of pages, completes the reading of the M-th page, and terminates the calculation of the cumulative normal distribution.

The aforementioned calculation of the cumulative normal distribution allows calculation of the arrangement in which a spread is present in the dynamic section V, as shown in FIG. 14.

Referring back to FIG. 6 again, in step S207, the image positioner 36 arranges the thumbnail images T of the pages to create the initial thumbnail image bundle SG.

Figure 15:
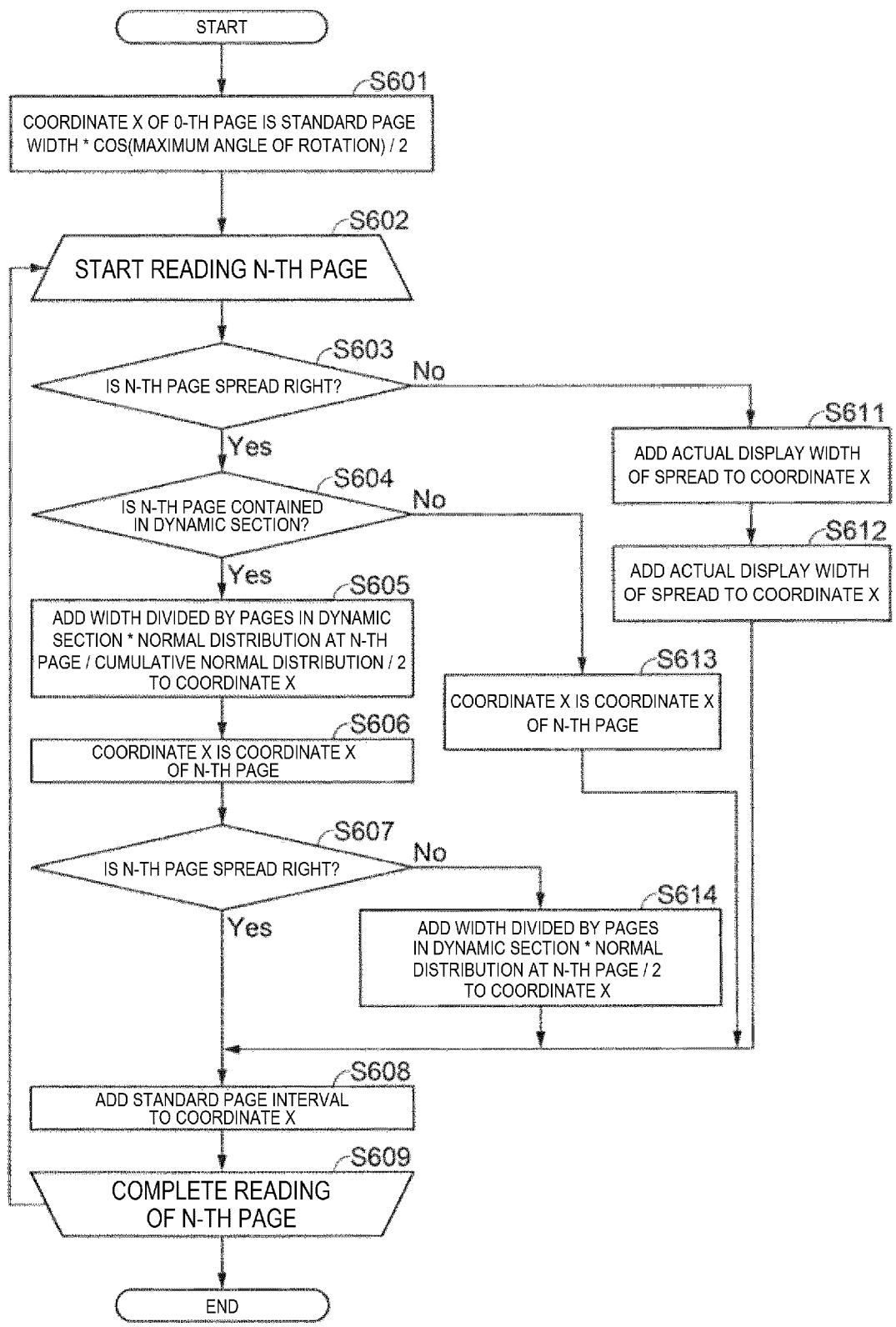
FIG. 15 is a flowchart showing an example of processes carried out by the viewer.

The action of the image positioner 36 that arranges the pages will be described below along the flowchart of FIG. 15.

In step S601, the image positioner 36 first sets the coordinate X of the 0-th page at "standard page width La*cos (maximum angle of rotation θmax)/2." Assuming that the left end of the first page out of the opposite ends thereof facing each other in the lateral direction corresponds to the coordinate X of zero, the coordinate X is the length from the left end in the X-axis direction, which is the lateral direction.

In step S602, the image positioner 36 then starts reading the N-th original image P. N is an integer greater than or equal to one.

Thereafter, in step S603, when the N-th page is the spread right, the result of step S603 is "Yes," and the image positioner 36 proceeds to step S604. In step S604, when the N-th page is contained in the dynamic section V, the result of step S604 is "Yes," and the image positioner 36 proceeds to step S605.

In step S605, the image positioner 36 then adds "width divided by pages in dynamic section*normal distribution at N-th page/cumulative normal distribution/2" to the coordinate X.

In step S606, the image positioner 36 then sets the coordinate X at the coordinate X of the N-th page.

Thereafter, in step S607, when the N-th page is the spread right, the result of step S607 is "Yes," and the image positioner 36 proceeds to step S608. In step S607, when the N-th page is not the spread right, the result of step S607 is "No," and the image positioner 36 proceeds to step S614. In step S614, the image positioner 36 adds "width divided by pages in dynamic section*normal distribution at N-th page/2" to the coordinate X and proceeds to step S608.

Thereafter, returning to step S604, when the N-th page is not contained in the dynamic section V, the result of step S604 is "No," and the image positioner 36 proceeds to step S613. In step S613, the image positioner 36 sets the coordinate X at the coordinate X of the N-th page and proceeds to step S608.

Thereafter, returning to step S603, when the N-th page is not the spread right, the result of step S603 is "No," and the image positioner 36 proceeds to step S611. In step S611, the image positioner 36 adds the actual display width of the spread to the coordinate X.

In step S612, the image positioner 36 then sets the coordinate X at the coordinate X of the N-th page and proceeds to step S608.

In step S608, the image positioner 36 then adds the standard page interval La to the coordinate X. In step S609, the image positioner 36 returns to step S602, repeats the actions in steps S602 to S609 multiple times corresponding to the number of pages, completes the reading of the N-th page, and terminates the calculation of the coordinate X of each page.

Thereafter, based on the coordinates X of the pages calculated by the image positioner 36, the thumbnail images T produced by the GUI base section 30 and corresponding to the pages are arranged along the first imaginary rotational axis Q. The generation of the thumbnail image bundle SG is thus terminated.

Returning to FIG. 5, in step S105, the controller 3 displays the thumbnail image bundle SG formed of the thumbnail images T generated in step S104 on the image display section 2.

Figure 2B:
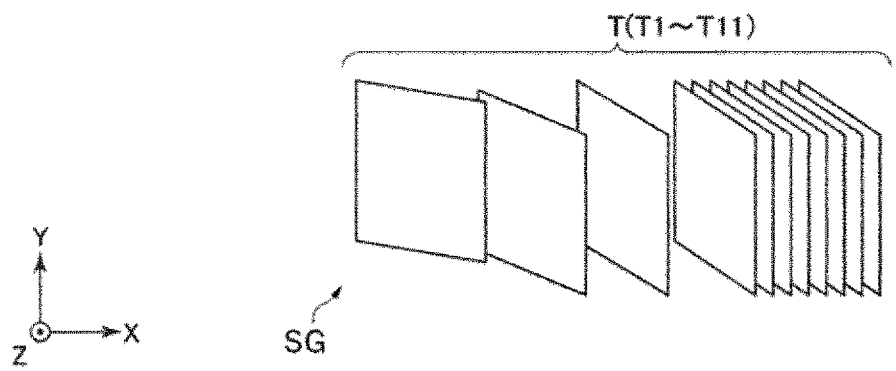
FIG. 2B is a partially enlarged plan view for describing a display method for moving a selected thumbnail image to a destination with a portion B of the thumbnail image bundle shown in FIG. 2A partially enlarged.

Based on the procedure formed of S101 to S105 described above, the initial thumbnail image bundle SG formed of the plurality of thumbnail images T arranged from left to right in the ascending order of page number along the lateral direction of the image display section 2 is displayed on the image display section 2, as shown in FIGS. 2A and 2B. That is, the procedure formed of S101 to S105 forms a display step of displaying the thumbnail image bundle SG including the plurality of thumbnail images T and having the static section L, in which the plurality of thumbnail images T therein are densely so arranged that the thumbnail images T partially overlap with each other, and the dynamic section V, in which the plurality of thumbnail images T therein are sparsely arranged as compared with those in the static section L.

The variety of values calculated in the steps described above are stored in the RAM 5 on a page basis, read from the RAM 5 whenever necessary for calculation, and used in a variety of types of calculation.

According to the procedure described above, the thumbnail images T arranged in the static section L are each so displayed as to partially overlap with the adjacent thumbnail image Tin the thumbnail image bundle SG, whereby part of the contents described in the thumbnail images T is recognizable. Further, the thumbnail images T arranged in the dynamic section V are so displayed that a thumbnail image T closer to the predetermined position K has a smaller angle of rotation θ around the second imaginary rotational axis M, so that a thumbnail image T closer to the predetermined position K has a wider image width, whereby the content described in the thumbnail image T is more readily recognizable. The contents described in all the thumbnail images T are therefore collectively recognizable.

Since the predetermined position K is located at the center of the dynamic section V in the lateral direction in which the plurality of thumbnail images T are juxtaposed, thumbnail images T each having a large image width are arranged on opposite sides of the predetermined position K, whereby the contents described in the thumbnail images T arranged in the dynamic section V are more readily recognizable.

Figure 2C:
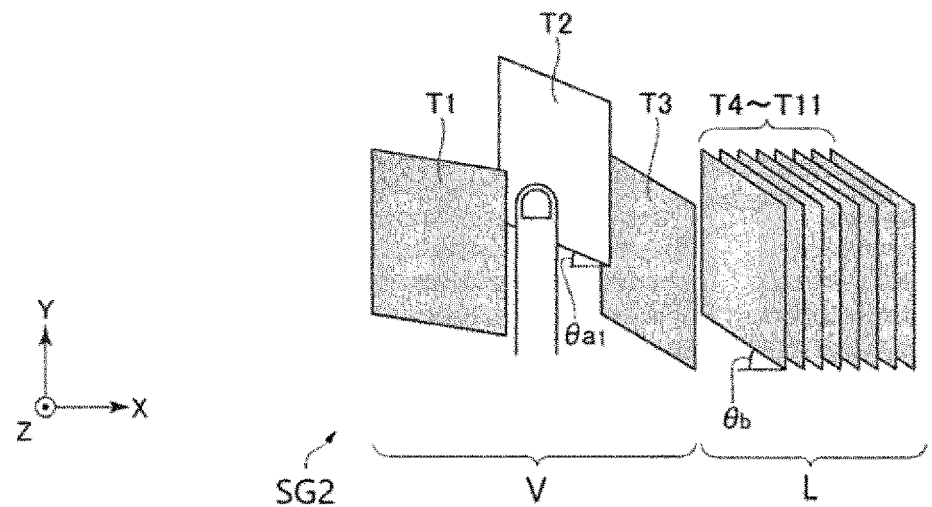
FIG. 2C is a partially enlarged plan view for describing the display method for moving the selected thumbnail image to the destination with the portion B of the thumbnail image bundle shown in FIG. 2A partially enlarged.

Returning to FIG. 5 again, in step S106, the controller 3 creates a thumbnail image bundle SG2, in which a thumbnail image T2 is selected from the thumbnail images T in the thumbnail image bundle SG, by using a plurality of thumbnail images T1 to T11 generated by the GUI base section 30 and so deformed as to show the state in which the thumbnail image T2 has been selected, as shown in FIG. 2C. The thumbnail image bundle SG2 at the time of selection of the thumbnail image T2, at the time of movement thereof, and after the movement thereof is hereinafter simply referred to as the "thumbnail image bundle SG."

Specifically, in the present embodiment, the input section 7 transmits an operation signal representing that the thumbnail image T2 out of the plurality of thumbnail images T located in the dynamic section V has been moved as the selected image in the direction +Y or toward the upper side by the user who has dragged the thumbnail image T2 with a finger on the touch panel 7G, that is, a parameter representing the thumbnail image bundle SG2 so deformed as to show the state in which the thumbnail image T2 has been moved upward, as shown in FIG. 2C, to the touch processor 40. The touch processor 40 then forwards the operation signal in the form of the parameter to the effective rectangle processor 34, and the effective rectangle processor 34 then sets a thumbnail image display region in the state in which the thumbnail image T2 has been moved upward, that is, the thumbnail image T2 has been selected.

The GUI base section 30 then carries out the processes in steps S201 to S207 described above in the same manner described above except that the GUI base section 30 uses the thumbnail image display region in the state in which the thumbnail image 12 has been moved upward to create the thumbnail image bundle SG2 showing the state in which the thumbnail image T2 has been moved upward.

In step S107, the controller 3 then displays on the image display section 2 the thumbnail image bundle SG2 generated in step S106 and showing the state in which the thumbnail image 12 has been moved upward, that is, the thumbnail image T2 has been selected as the selected image.

In the thumbnail image bundle SG2 showing the state in which where the thumbnail image T2 has been moved upward, having moved the thumbnail image T2 upward beyond the other thumbnail images T1 and T3 to T11 changes how to display the thumbnail image T2 as the selected image, as shown in FIG. 2C. As a result, the user can readily visually recognize that the thumbnail image T2 has been selected as the selected image in the thumbnail image bundle SG2 displayed on the image display section 2.

The height to which the thumbnail image T2 is moved upward beyond the other thumbnail images T1 and T3 to T11 is not limited to a specific value. For example, the height is preferably about greater than or equal to ¼ but smaller than or equal to ¾ of the length of the long edges of the thumbnail image T2, that is, the length thereof in the direction +Y. The user can thus reliably recognize that the thumbnail image T2 has been selected.

Further, in the present embodiment, the thumbnail images T1 and T3 to T11 that have not been selected are displayed in gray, as shown in FIG. 2C. Changing as described above how to display the thumbnail images T1 and T3 to T11 as non-selected images that have not been selected allows enhancement of the fact that the thumbnail image T2 has been selected as the selected image.

In FIG. 2C, the fact that the thumbnail image T2 has been selected is enhanced by changing how to display both the thumbnail image T2 as the selected image and the thumbnail images T1 and T3 to T11 as the non-selected images. Instead, how to display one of the two sets of thumbnail images T may be changed, or how to display the two sets of thumbnail images T may not both be changed. It is, however, noted that changing both how to display the two sets of thumbnail images T, as in the present embodiment, allows the user to reliably recognize that the thumbnail image T2 has been selected.

Still instead, how to display the thumbnail image T2 can be changed by changing the color of the thumbnail image T2 as the selected image. Still further instead, how to display the thumbnail image T2 can be changed, for example, by changing the shape of the thumbnail image T2, changing the size of the thumbnail image T2, or moving the thumbnail image T2 upward or downward in addition to the methods described above. In FIG. 2C, the thumbnail image T2 is selected as the selected image in response to reception of the operation signal indicating that the thumbnail image T2 was moved in the direction +Y by the user who dragged the thumbnail image T2 with a finger, but not necessarily. The thumbnail image T2 can also be selected as the selected image in response to reception of an operation signal indicating that the thumbnail image T2 is being pressed for a long period with the user's finger.

Based on the procedure formed of S106 and S107 described above, the controller 3 displays on the image display section 2 the thumbnail image bundle SG2 at the time of selection in which the thumbnail image 12 located in the dynamic section V is selected as the selected image out of the plurality of thumbnail images from T1 to T11 displayed on the image display section 2, as shown in FIG. 2C. That is, the procedure formed of S106 and S107 forms a selection step of selecting the thumbnail image T2 located in the dynamic section V as the selected image.

Figure 2D:
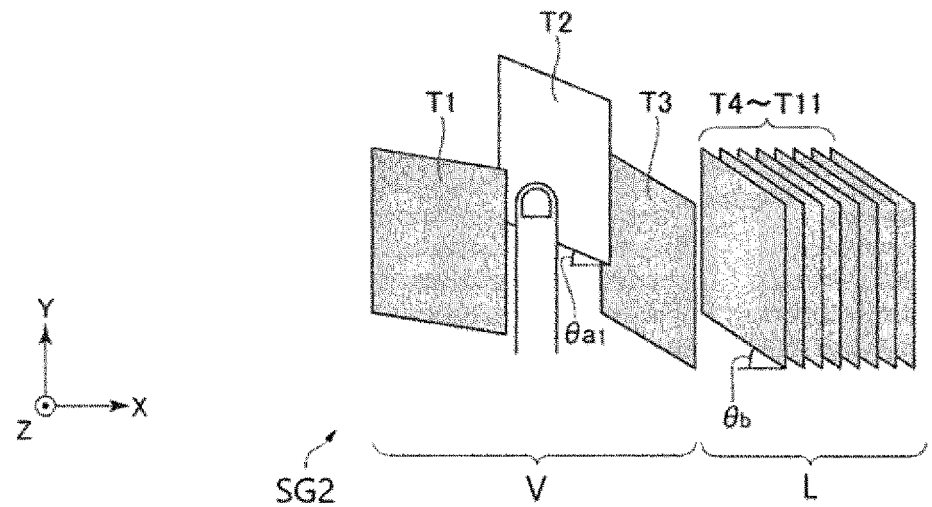
FIG. 2D is a partially enlarged plan view for describing the display method for moving the selected thumbnail image to the destination with the portion B of the thumbnail image bundle shown in FIG. 2A partially enlarged.
Figure 2E:
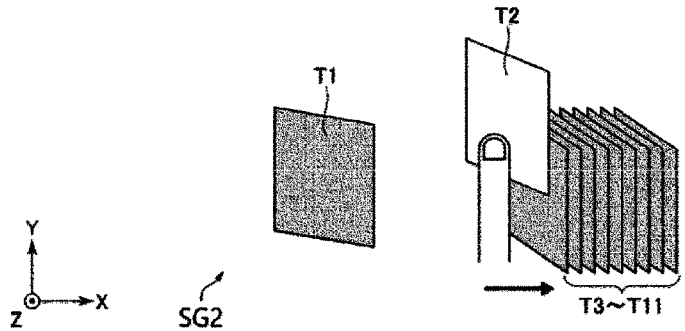
FIG. 2E is a partially enlarged plan view for describing the display method for moving the selected thumbnail image to the destination with the portion B of the thumbnail image bundle shown in FIG. 2A partially enlarged.

Returning to FIG. 5 again, in step S108, the controller 3 creates the thumbnail image bundle SG2 in which a thumbnail image T2 as the selected image has been moved by using the plurality of thumbnail images T1 to T11 generated by the GUI base section 30 and so deformed as to show the state in which the thumbnail image T2 has been moved, as shown in FIG. 2E.

Specifically, the user first drags the thumbnail image T2 as the selected image in the dynamic section V with a finger to move the thumbnail image T2 toward the static section L so located as to face the positive side of the direction X, as shown in FIG. 2D. In response to the user's dragging operation with a finger, the input section 7 transmits an operation signal that moves the thumbnail image T2 located in the dynamic section V in the direction +X or toward the right side on the touch panel 7G, that is, a parameter representing the thumbnail image bundle SG2 so deformed as to show the state in which the thumbnail image T2 has been moved rightward to the touch processor 40. The touch processor 40 then forwards the operation signal in the form of the parameter to the effective rectangle processor 34, and the effective rectangle processor 34 then sets a thumbnail image display region in the state in which the thumbnail image T2 has been moved rightward.

The GUI base section 30 then carries out the processes in steps S201 to S207 described above in the same manner described above except that the GUI base section 30 uses the thumbnail image display region in the state in which the thumbnail image T2 has been moved rightward to create the thumbnail image bundle SG2 showing the state in which the thumbnail image T2 has been moved rightward.

In step S109, the controller 3 then displays on the image display section 2 the thumbnail image bundle SG2 generated in step S108 and showing the state in which the thumbnail image T2 has been moved rightward.

In the thumbnail image bundle SG2 showing the state in which the thumbnail image T2 has been moved rightward, the thumbnail image T2 has been moved toward the thumbnail images T3 to T11, which are located on the right of the thumbnail image T2, that is, so located as to face the positive side of the direction X, so that the thumbnail images T3 to T11 are so displayed in a compressed state, that is, the thumbnail image T2 to T11 are displayed in a narrower area than the area before the thumbnail image T2 is moved rightward, as shown in FIG. 2E.

The destination to which the thumbnail image T2 is moved is the static section L, which is the dense region. On the upstream and downstream of the destination, the arrangement density of the thumbnail images T lowers, so that the thumbnail images T are arranged more sparsely. The action of lowering the arrangement density of the thumbnail images T will be described below.

Figure 2F:
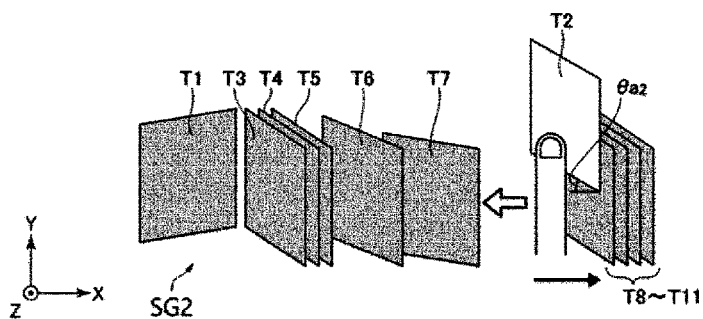
FIG. 2F is a partially enlarged plan view for describing the display method for moving the selected thumbnail image to the destination with the portion B of the thumbnail image bundle shown in FIG. 2A partially enlarged.
Figure 2G:
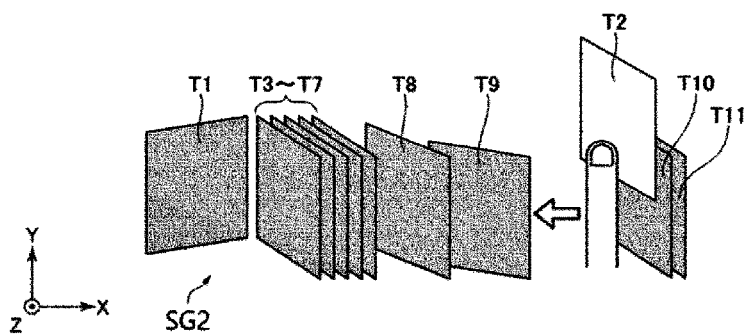
FIG. 2G is a partially enlarged plan view for describing the display method for moving the selected thumbnail image to the destination with the portion B of the thumbnail image bundle shown in FIG. 2A partially enlarged.

Returning to FIG. 5 again, in step S110, the controller 3 creates the thumbnail image bundle SG2 in which the gaps between the thumbnail images T at the destination to which the thumbnail image T2 is moved are widened in accordance with the movement of the thumbnail image T2 by using the plurality of thumbnail images T1 to T11 generated by the GUI base section 30 and so deformed as to show the state in which the gaps between the thumbnail images T at the destination to which the thumbnail image T2 is moved are widened, as shown in FIGS. 2F and 2G.

Specifically, in response to the user's continuous dragging operation with a finger rightward, that is, in +X-axis direction, the input section 7 first transmits to the touch processor 40 a parameter representing the thumbnail image bundle SG2 so deformed as to show the state in which part of the thumbnail images T located on the right of the thumbnail image T2 is moved on the touch panel 7G leftward, that is, in the direction −X and the arrangement density of the rightmost image and the images adjacent thereto out of the thumbnail images T having been moved rightward is smaller than the arrangement density in the static section L, that is, the state in which the gaps between the thumbnail images T at the destination to which the thumbnail image T2 is moved are widened, as shown in FIG. 2F. The touch processor 40 then forwards an operation signal in the form of the parameter to the effective rectangle processor 34, and the effective rectangle processor 34 then sets a thumbnail image display region in which the gaps between the thumbnail images T at the destination to which the thumbnail image T2 is moved are widened.

The GUI base section 30 then carries out the processes in steps S201 to S207 described above in the same manner described above except that the GUI base section 30 uses the thumbnail image display region in the state in which the gaps between the thumbnail images T at the destination to which the thumbnail image T2 is moved are widened to create the thumbnail image bundle SG showing the state in which the gaps between the thumbnail images T at the destination to which the thumbnail image T2 is moved are widened, as shown in FIG. 2F.

In step S111, the controller 3 then displays on the image display section 2 the thumbnail image bundle SG2 in FIG. 2F generated in step S110 and showing the state in which the thumbnail image T2, that is, the selected image has been moved rightward.

In response to the user's further continuous dragging operation with a finger rightward, the input section then transmits to the touch processor 40 a parameter representing the thumbnail image bundle SG2 so deformed as to show the state in which part of the thumbnail images T located on the right of the thumbnail image T2 is moved leftward on the touch panel 7G and the arrangement density of the rightmost images and the image adjacent thereto out of the thumbnail images T having been moved leftward is smaller than the arrangement density in the static section L, that is, the state in which the gaps between the thumbnail images T at the destination to which the thumbnail image T2 is moved are widened, as shown in FIG. 2G. The touch processor 40 then forwards an operation signal in the form of the parameter to the effective rectangle processor 34, and the effective rectangle processor 34 then sets a thumbnail image display region in which the gaps between the thumbnail images T at the destination to which the thumbnail image T2 is moved are widened.

The GUI base section 30 then carries out the processes in steps S201 to S207 described above in the same manner described above except that the GUI base section 30 uses the thumbnail image display region in the state in which the gaps between the thumbnail images T at the destination to which the thumbnail image T2 is moved are widened to create the thumbnail image bundle SG showing the state in which the gaps between the thumbnail images T at the destination to which the thumbnail image T2 has been moved are widened, as shown in FIG. 2G.

In step S111, the controller 3 then displays on the image display section 2 the thumbnail image bundle SG2 in FIG. 2G generated in step S110 and showing the state in which the thumbnail image T2, that is, the selected image has been moved rightward.

In steps S110 and S111 described above, the actions described in steps S110 and S111 are repeatedly performed until the destination to which the thumbnail image T2 is moved is correctly displayed on the image display section 2.

The actions will be more specifically described with reference to FIGS. 2F and 2G. In FIG. 2F, the thumbnail image bundle SG showing the state in which the gaps between the thumbnail images T at the destination to which the thumbnail image T2 has been moved are widened is so displayed that, out of the thumbnail images T3 to T11 located on the right of the thumbnail image T2, the thumbnail images T3 to T7, which are part of the thumbnail images T3 to T11, are first moved to the left of the thumbnail image T2 in FIG. 2F and the arrangement density of the thumbnail image T7, which is the rightmost thumbnail image in the thumbnail images T3 to T7, and the image T6 adjacent to the thumbnail image T7 is smaller than the arrangement density of the thumbnail images T8 to T11. In FIG. 2G, which follows FIG. 2F, the thumbnail image bundle SG2 is so displayed that the thumbnail images T8 and T9 located on the right of the thumbnail image T2 are moved to the left of the thumbnail image T2 and the arrangement density of the thumbnail image T9, which is the rightmost thumbnail image in the thumbnail images T8 and T9, and the image T9 adjacent to the thumbnail image T9 is smaller than the arrangement density of the thumbnail images T10 and T11. In step S110, as long as the rightward movement of user's finger continues, the aforementioned display operation, which is performed on the image display section 2 and shows that the gaps between the thumbnail images T at the destination to which the thumbnail image T2 is moved are widened, is repeatedly performed. In this process, the user can recognize information on the images corresponding to the thumbnail images T because the thumbnail images T so displayed that the arrangement density thereof lowers, that is, the thumbnail image T7 in FIG. 2F and the thumbnail image T9 in FIG. 2G have a small overlapping region where the two images overlap with each other. The user can therefore correctly recognize the destination to which the thumbnail image T2 should be moved.

In steps S110 and S111, the angle of rotation G, by which the thumbnail image T are rotated around the second imaginary rotational axis M, that is, the angle of inclination by which the upper and lower edges of the thumbnail images T incline is set that the angle of rotation θ of the thumbnail image T2 is greater than an angle of rotation θa1 in FIG. 2C, as indicated by an angle of rotation θa2 in FIG. 2F, that is, the angle of rotation θ of the thumbnail image T2 is close to an angle of rotation θb of the thumbnail image T4 located in the static section L in FIG. 2C. The thumbnail image T2 moved from the dynamic section V and displayed in the static section L can thus be displayed without causing the user to feel uneasy as compared with the thumbnail image T2 originally located in the static section L, that is, the thumbnail images T8 to T11 in FIG. 2F.

Based on the procedure formed of S108 to S111 described above, the controller 3 displays on the image display section 2 the thumbnail image bundle SG2 in which the thumbnail image T2 is moved to a position between the thumbnail images T9 and T10, which are located in the static section L and serve as the destination, out of the plurality of thumbnail images T1 to T11 and the thumbnail image T9 displayed as the spread allows recognition of information on the image corresponding to the thumbnail image T9, as shown in FIG. 2G. That is, the procedure formed of S108 to S111 forms a movement step of moving the thumbnail image T2 as the selected image to a predetermined destination in the static section L and a wide gap step of converting the dense state of the destination to which the thumbnail image T2 has been moved into a sparse state of the destination by widening the gaps between the adjacent images at the destination.

Figure 2H:
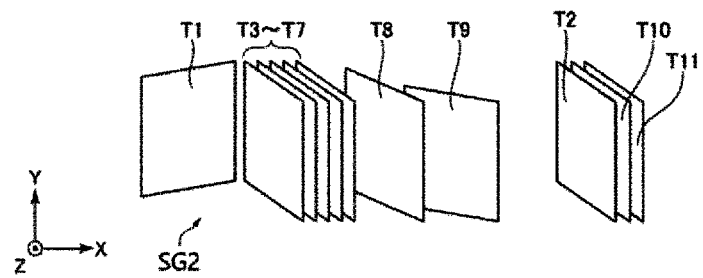
FIG. 2H is a partially enlarged plan view for describing the display method for moving the selected thumbnail image to the destination with the portion B of the thumbnail image bundle shown in FIG. 2A partially enlarged.

Returning to FIG. 5 again, in step S112, the controller 3 creates the thumbnail image bundle SG2 in which the thumbnail image T2 has been placed at the destination by using the plurality of thumbnail images T1 to T11 generated by the GUI base section 30 and so deformed as to show the state in which the thumbnail image T2 has been placed at the destination, as shown in FIG. 2H.

Specifically, the user first recognizes information on the image corresponding to the thumbnail image T9 displayed as the spread shown in FIG. 2G to determine that the gap between the thumbnail images T9 and T10 is the destination to which the thumbnail image T2 should be moved and drops the thumbnail image T2 to the gap with the finger. In response to the user's dropping operation with the finger, the input section 7 transmits an operation signal representing that the thumbnail image T2 has been placed at the destination on the touch panel 7G, that is, a parameter representing the thumbnail image bundle SG2 so deformed as to show the state in which the thumbnail image T2 is placed between the thumbnail images T9 and T10 to the touch processor 40. The touch processor 40 then forwards the operation signal in the form of the parameter to the effective rectangle processor 34, and the effective rectangle processor 34 then sets a thumbnail image display region in the state in which the thumbnail image T2 has been placed at the destination.

The GUI base section 30 then carries out the processes in steps S201 to S207 described above in the same manner described above except that the GUI base section 30 uses the thumbnail image display region in the state in which the thumbnail image T2 has been placed at the destination to create the thumbnail image bundle SG2 showing the state in which the thumbnail image T2 has been placed at the destination, that is, the state in which the thumbnail image T2 has been placed between the thumbnail images T9 and T10, as shown in FIG. 2H.

In step S113, the controller 3 then displays on the image display section 2 the thumbnail image bundle SG2 generated in step S112 and showing the state in which the thumbnail image T2 has been placed at the destination.

When the user drops the thumbnail image T2, the user can visually recognize information on the image corresponding to the thumbnail image T9 and can therefore correctly recognize the gap between the thumbnail images T9 and T10 as the destination to which the thumbnail image T2 should be moved, as shown in FIG. 2G, whereby the user can correctly move the thumbnail image T2 to the gap between the thumbnail images T9 and T10.

Further, in the present embodiment, in the thumbnail image bundle SG2 showing the state in which the thumbnail image T2 has been placed at the destination, the action of displaying the thumbnail image T2 in a position above the other thumbnail images T1 and T3 to T11, as shown in FIG. 2G, is omitted, but the thumbnail images T1 to T11 are arranged in a single row in the Y-axis direction. Further, displaying the thumbnail images T1 and T3 to T11 excluding the thumbnail image T2 in gray is terminated. That is, the action of enhancing the state in which the thumbnail image T2 has been selected as the selected image is terminated.

Based on the procedure formed of S112 and S113 described above, the controller 3 displays on the image display section 2 the thumbnail image bundle SG2 in which the thumbnail image T2 selected as the selected image from the plurality of thumbnail images T1 to T11 is placed between the thumbnail images T9 and T10, which are the thumbnail images at the destination, as shown in FIG. 2H. That is, the procedure formed of S112 and S113 forms a placement step of placing the thumbnail image T2 as the selected image at the destination between the sparsely arranged thumbnail images T9 and T10.

Carrying out steps S101 to S113 described above allows the thumbnail image T2 as the selected image to be placed between the thumbnail images T9 and T10, which are the thumbnail images at the destination in the static section L.

The selection, movement, and placement of the thumbnail image T2 in steps S101 to S113 are not limited to the action of dragging and dropping the thumbnail image T2 with the user's finger on the touch panel 7G and may be performed by using any of the buttons 7A to 7F. Further, when the viewer 10 includes a mouse, a keyboard, and other components as an operation section, any of the components described above may be used to perform the selection, movement, and placement of the thumbnail image T2.

Moreover, the present embodiment has been described with reference to the case where the thumbnail images T are juxtaposed in the X-axis direction in the thumbnail image bundle SG before the thumbnail image T2 in the thumbnail image bundle SG is moved by carrying out steps S101 to S113, as shown in FIG. 2A and other figures, but not necessarily. The thumbnail images T may be juxtaposed in the Y-axis direction in the thumbnail image bundle SG by swapping the directions X-axis and Y-axis.

The display apparatus to which the display method according to the present disclosure is applied, that is, the display apparatus according to the present disclosure is not limited to the viewer shown in FIG. 1 and can, for example, be a personal computer, a mobile phone, a digital still camera, a television receiver, a video camcorder, a video tape recorder, a car navigator, an electronic dictionary, a desktop calculator, an electronic game console, a word processor, a workstation, a TV phone, a security television monitor, electronic binoculars, a POS terminal, an electronic instrument including a touch panel, a medical instrument, a fish finder, a variety of measuring instruments, a variety of meters, a flight simulator, a variety of other monitors, and an apparatus including an image display section, such as a projector and other projection-type display apparatuses.

The display method and the display apparatus according to the present disclosure have been described above based on the illustrated embodiment, but the present disclosure is not limited thereto.

For example, in the display method according to the present disclosure, one or more steps for arbitrary purposes may be added as required.

In the display apparatus according to the present disclosure, each configuration can be replaced with an arbitrary configuration that can provide the same function, or an arbitrarily configuration can be added.

What is claimed is:

1. A display method comprising:
 a display step of displaying an image group including a plurality of images, the plurality of images being displayed in a first dense region and a second dense region where first images of the plurality of images are so densely arranged that the first images partially overlap with each other and a sparse region where arrangement of second images of the plurality of images is sparser than in the first dense region and the second dense region, the plurality of images being juxtaposed in a straight line with each of the plurality of images arranged one after another along the straight line, the straight line having a first end and a second end, the first dense region being located at the first end, the second dense region being located at the second end, the sparse region being located between the first dense region and the second dense region, the first images including two or more images of the plurality of images, the second images including two or more images of the plurality of images;

a selection step of selecting any of the second images located in the sparse region as a selected image;

a movement step of moving the selected image along the straight line to a predetermined destination in the first dense region or the second dense region;

a wide gap step of converting the dense state at the predetermined destination into a sparse state at the predetermined destination by widening a gap between the first images adjacent to each other at the predetermined destination; and a placement step of placing the selected image at the predetermined destination having the sparse state, wherein display of at least one of the selected image and non-selected images that were not selected is changed in the selection step, the non-selected images including the first images in the first dense region and the second dense region and the second images in the sparse region other than the selected image, and before the selection step starts and after the placement step is completed, the images displayed in the first dense region and the second dense region remain partially overlapped with each other and the images displayed in the sparse region remain being sparser from each other than the images in the first dense region and the second dense region.

2. The display method according to claim 1, wherein widening the gap between the first images adjacent to each other at the predetermined destination in the wide gap step causes the first images adjacent to each other to have a small overlapping region where the first images adjacent to each other overlap with each other, allowing recognition of information described in the first images adjacent to each other.

3. The display method according to claim 1, wherein the plurality of images each have a quadrangular shape, and the plurality of images displayed in the image group each have a pair of inclining edges facing each other out of four edges.

4. The display method according to claim 3, wherein an angle of inclination of the selected image by which the pair of edges incline is set so that the angle of inclination at the predetermined destination is greater than the angle of inclination of other images in the sparse region.

5. A display apparatus comprising:

a display that displays an image group including a plurality of images, the plurality of images being displayed in a first dense region and a second dense region where first images of the plurality of images are so densely arranged that the first images partially overlap with each other and a sparse region where arrangement of second images of the plurality of images is sparser than in the first dense region and the second dense region, the plurality of images being juxtaposed in a straight line with each of the plurality of images arranged one after another along the straight line, the straight line having a first end and a second end, the first dense region being located at the first end, the second dense region being located at the second end, the sparse region being located between the first dense region and the second dense region, the first images including two or more images of the plurality of images, the second images including two or more images of the plurality of images; and one or more processors that controls the display in such a way that a selected image selected from the second images located in the sparse region is placed at a predetermined destination in the first dense region or the second dense region, wherein the one or more processors selects the selected image located in the sparse region, the selected image is moved to the predetermined destination in the first dense region or the second dense region along the straight line to the predetermined destination in the first dense region or the second dense region, the dense state at the predetermined destination is converted into a sparse state at the predetermined destination by widening a gap between the first images adjacent to each other at the predetermined destination, and the selected image is placed at the predetermined destination having the sparse state, wherein display of at least one of the selected image and non-selected images that were not selected is changed, the non-selected images including the first images in the first dense region and the second dense region and the second images in the sparse region other than the selected image, and before the selected image is selected and after the selected image has been placed at the predetermined destination, the images displayed in the first dense region and the second dense region remain partially overlapped with each other and the images displayed in the sparse region remain being sparser from each other than the images in the first dense region and the second dense region.

* * * * *